United States Patent
Inazawa et al.

(10) Patent No.: US 9,732,219 B2
(45) Date of Patent: Aug. 15, 2017

(54) FLAME-RETARDANT RESIN COMPOSITION COMPRISING A POLYCARBONATE-POLYDIORGANOSILOXANE COPOLYMER RESIN AND MOLDED ARTICLE THEREOF

(71) Applicant: TEIJIN LIMITED, Osaka (JP)

(72) Inventors: Yasunori Inazawa, Tokyo (JP); Masashi Ishida, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 504 days.

(21) Appl. No.: 14/361,089

(22) PCT Filed: Nov. 27, 2012

(86) PCT No.: PCT/JP2012/081227
§ 371 (c)(1),
(2) Date: May 28, 2014

(87) PCT Pub. No.: WO2013/081161
PCT Pub. Date: Jun. 6, 2013

(65) Prior Publication Data
US 2014/0303296 A1    Oct. 9, 2014

(30) Foreign Application Priority Data

Dec. 2, 2011  (JP) ................................. 2011-264667
Dec. 2, 2011  (JP) ................................. 2011-264668

(51) Int. Cl.
| | |
|---|---|
| C08L 69/00 | (2006.01) |
| C08K 3/34 | (2006.01) |
| C08K 5/42 | (2006.01) |
| C08L 55/02 | (2006.01) |
| C08K 5/523 | (2006.01) |

(52) U.S. Cl.
CPC ............... *C08L 69/00* (2013.01); *C08K 3/34* (2013.01); *C08K 5/42* (2013.01); *C08K 5/523* (2013.01); *C08L 55/02* (2013.01)

(58) Field of Classification Search
CPC .. C08K 3/34; C08K 5/42; C08K 5/523; C08L 69/00; C08L 55/02
USPC ........................................ 524/127, 268, 165
See application file for complete search history.

(56) References Cited

U.S. PATENT DOCUMENTS

| | | | |
|---|---|---|---|
| 2006/0074156 A1* | 4/2006 | Ebeling | C08L 83/10 524/115 |
| 2009/0088514 A1 | 4/2009 | Shiping | |
| 2011/0052895 A1* | 3/2011 | Li | C08L 69/00 428/220 |

FOREIGN PATENT DOCUMENTS

| | | |
|---|---|---|
| CN | 101874073 | 10/2010 |
| JP | 2-115262 | 4/1990 |
| JP | 2-199162 | 8/1990 |
| JP | 8-302178 | 11/1996 |
| JP | 3037588 | 2/2000 |
| JP | 3457805 | 8/2003 |
| JP | 2004-35587 | 2/2004 |
| JP | 2004-143410 | 5/2004 |
| JP | 2007-520621 | 7/2007 |
| JP | 2008-516013 | 5/2008 |
| JP | 2010-106097 | 5/2010 |
| WO | 2005/075568 | 8/2005 |
| WO | 2006/041762 | 4/2006 |
| WO | 2009/040772 | 4/2009 |

OTHER PUBLICATIONS

International Preliminary Report on Patentability and Written Opinion issued Jun. 3, 2014 in corresponding International Application No. PCT/JP2012/081227.
International Search Report issued Feb. 19, 2013 in corresponding International Application No. PCT/JP2012/081227.
Search Report issued Apr. 10, 2015 in corresponding European Application No. 12852632.4.
Office Action dated Mar. 2, 2017 in corresponding Japanese Application No. 2016-013172, with English Translation.

* cited by examiner

*Primary Examiner* — Ling Choi
*Assistant Examiner* — Chun-Cheng Wang
(74) *Attorney, Agent, or Firm* — Wenderoth, Lind & Ponack, L.L.P.

(57) ABSTRACT

A thermoplastic resin composition having good balance among impact resistance, flame retardancy, heat resistance and flowability all of which are required for thin molded articles high-dimensionally.

The flame retardant resin composition comprises 100 parts by weight of a resin component comprising (A) a polycarbonate resin and (B) a polycarbonate-polydiorganosiloxane copolymer resin obtained by copolymerizing a dihydric phenol with a hydroxyaryl-terminated polydiorganosiloxane, (C) 3 to 35 parts by weight of an organic phosphorus-based flame retardant or 0.005 to 5 parts by weight of an organic metal salt-based flame retardant, (D) 0.1 to 30 parts by weight of a silicate mineral and (E) 0.1 to 3 parts by weight of a dripping inhibitor, and, if necessary, (F) 3 to 45 parts by weight of a styrene resin
wherein
the polydiorganosiloxane content of the component (B) in the composition is 0.2 to 0.6 wt %.

9 Claims, No Drawings

FLAME-RETARDANT RESIN COMPOSITION COMPRISING A POLYCARBONATE-POLYDIORGANOSILOXANE COPOLYMER RESIN AND MOLDED ARTICLE THEREOF

TECHNICAL FIELD

The present invention relates to a flame retardant resin composition having excellent flame retardancy even when it is formed into a thin molded article and to a molded article thereof. More specifically, it relates to a flame retardant resin composition which has excellent flame retardancy and high impact resistance and flowability when a predetermined amount of a polycarbonate-polydiorganosiloxane copolymer resin is added thereto and to a molded article thereof.

BACKGROUND ART

Since an aromatic polycarbonate resin has excellent mechanical properties and thermal properties, it is used in a wide variety of industrial fields. However, the aromatic polycarbonate resin is inferior in moldability since it has poor flowability due to its high melt viscosity. To improve the flowability of the aromatic polycarbonate resin, a large number of polymer alloys of the aromatic polycarbonate and another thermoplastic resin have been developed. Out of these, a polymer alloy of the aromatic polycarbonate and a styrene-based resin typified by ABS resin is widely used in fields such as OA equipment, electronic and electric equipment and automobiles. Requests for the flame retardation of resin materials which are mainly used in OA equipment and home electric appliances in particular have been strong. To meet the requests, studies have been made on a polymer alloy of an aromatic polycarbonate resin and ABS resin so as to satisfy the requirement for the flame retardation of a thin molded article, for example, UL94 5VB which is a safety standard required for large-sized products.

A combination of a halogen-based flame retardant containing bromine and a flame retarding aid such as antimony trioxide has generally been used for the flame retardation of the polymer alloy. For example, as for 5VB flame retardation, there is proposed a method in which a flame retardant and a flame retarding aid are added to a blend of an aromatic polycarbonate resin and ABS resin and then polytetrafluoroethylene having fibril formability and an inorganic filler having specific L/D such as talc is added (refer to JP-A 2-199162).

However, studies into flame retardation by using an organic phosphorus-based flame retardant containing no halogen-based compound having bromine are now actively under way due to a problem such as the production of a harmful substance at the time of combustion. For example, a large number of compositions obtained by adding an organic phosphorus-based flame retardant and further polytetrafluoroethylene having fibril formability to a polymer alloy of an aromatic polycarbonate resin and ABS resin have been proposed, and information related to these is widely known (refer to JP-A 2-115262).

The method of improving flame retardancy by mixing a polycarbonate-organopolysiloxane copolymer resin with an aromatic polycarbonate resin is disclosed by Japanese Patent No. 3037588. However, a polycarbonate resin composition comprising no flame retardant is unsatisfactory in achieving flame retardancy as high as UL94 5VB required for large-sized equipment such as OA equipment when it is thin though it is excellent in heat stability and long-term heat resistance. Although the method of improving flame retardancy by mixing a phosphoric acid ester with an aromatic polycarbonate resin containing a predetermined amount of silicon and a polycarbonate-organopolysiloxane copolymer resin is disclosed by Japanese Patent No. 3457805, since a small amount of the phosphoric acid ester is used and no silicate mineral is added, UL94 5VB rating is not attained when the resulting mixture is thin. Further, although the method of improving flame retardancy by mixing an organic sulfonic acid metal salt is disclosed by JP-A 8-302178, the improvement of a flame retarding effect to some extent is observed but the method is unsatisfactory in achieving flame retardancy as high as UL94 5VB which is required for large-sized equipment such as OA equipment when the resulting mixture is thin. Also, a halogen-free, phosphorus-free flame retarding effect obtained by mixing a silicone-based flame retardant containing a functional group and an inorganic filler with a polycarbonate resin, a polycarbonate-polydiorganosiloxane copolymer resin and a styrene-based resin is disclosed (refer to Japanese Patent No. 3616791). However, although the silicone-based flame retardant provides flame retardancy while heat resistance is retained, it is unsatisfactory in achieving flame retardancy as high as 5VB when the obtained mixture is thin.

JP-A 2004-35587 also discloses a resin composition which comprises an aromatic polycarbonate resin, a styrene-based resin, an alkali metal salt and/or an alkali earth metal salt, a silicone compound containing a functional group, an inorganic filler and a polytetrafluoroethylene resin. However, this publication does not teach that flame retardancy as high as 5VB can be attained when the resin composition is thin.

Although resin compositions having certain flame retardancy comprising a polycarbonate-polydiorganosiloxane copolymer resin are disclosed as described above, a resin composition having flame retardancy as high as UL94 5VB when the resin composition is thin is desired but not obtained yet.

DISCLOSURE OF THE INVENTION

In view of the above situation, it is an object of the present invention to provide a flame retardant resin composition having such high flame retardancy that UL94 5VB rating can be attained even when it is thin and a molded article thereof.

The inventors of the present invention conducted intensive studies to attain the above object and found that a flame retardant resin composition which has good balance among flame retardancy, impact resistance and flowability high-dimensionally even when it is formed into a thin molded article can be obtained by mixing a styrene-based resin typified by ABS resin, a phosphorus-based flame retardant, a silicate mineral and a dripping inhibitor with a polycarbonate resin and a predetermined amount of a polycarbonate-polydiorganosiloxane copolymer resin. The present invention was accomplished based on this finding.

According to the present invention, the above object is attained by a flame retardant resin composition comprising 100 parts by weight of a resin component comprising (A) a polycarbonate resin and (B) a specific polycarbonate-polydiorganosiloxane copolymer resin, (C) 3 to 35 parts by weight of an organic phosphorus-based flame retardant or 0.005 to 5 parts by weight of an organic metal salt-based flame retardant, (D) 0.1 to 30 parts by weight of a silicate mineral and (E) 0.1 to 3 parts by weight of a dripping inhibitor, wherein the polydiorganosiloxane content of the component (B) in the flame retardant resin composition is 0.2 to 0.6 wt %.

The flame retardant resin composition of the present invention has such high flame retardancy that UL94 5VB rating can be attained when the thickness of a molded article thereof is preferably not less than 1.2 mm, more preferably not less than 1.0 mm and much more preferably not less than 0.8 mm.

The present invention will be described in detail hereinunder.

BEST MODE FOR CARRYING OUT THE INVENTION (Component A: Polycarbonate Resin)

The polycarbonate resin used in the present invention is obtained by reacting a dihydric phenol with a carbonate precursor. Examples of the reaction include interfacial polymerization, melt transesterification, the solid-phase transesterification of a carbonate prepolymer and the ring-opening polymerization of a cyclic carbonate compound.

Typical examples of the dihydric phenol used herein include hydroquinone, resorcinol, 4,4'-biphenol, 1,1-bis(4-hydroxyphenyl)ethane, 2,2-bis(4-hydroxyphenyl)propane (commonly known as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl) fluorene. Out of these, bis (4-hydroxyphenyl)alkanes are preferred, and bisphenol A is particularly preferred from the viewpoint of impact resistance and commonly used.

In the present invention, a special polycarbonate which is produced by using another dihydric phenol may be used as the component A, besides bisphenol A-based polycarbonates which are general-purpose polycarbonates.

For example, polycarbonates (homopolymers or copolymers) obtained from 4,4'-(m-phenylenediisopropylidene)diphenol (may be abbreviated as "BPM" hereinafter), 1,1-bis (4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl) fluorene and 9,9-bis(4-hydroxy-3-methylphenyl) fluorene (may be abbreviated as "BCF" hereinafter) as part or all of the dihydric phenol component are suitable for use in fields in which the requirements for stability to dimensional change by water absorption and form stability are very strict. These dihydric phenols except BPA are used in an amount of preferably not less than 5 mol %, particularly preferably not less than 10 mol % of the whole dihydric phenol component constituting the polycarbonate.

Especially when high stiffness and excellent hydrolysis resistance are required, the component A constituting the resin composition is particularly preferably one of the following copolycarbonates (1) to (3).

(1) A copolycarbonate which comprises 20 to 80 mol %, preferably 40 to 75 mol % and more preferably 45 to 65 mol % of BPM and 20 to 80 mol %, preferably 25 to 60 mol % and more preferably 35 to 55 mol % of BCF based on 100 mol % of the dihydric phenol component constituting the polycarbonate.

(2) A copolycarbonate which comprises 10 to 95 mol %, preferably 50 to 90 mol % and more preferably 60 to 85 mol % of BPA and 5 to 90 mol %, preferably 10 to 50 mol % and more preferably 15 to 40 mol % of BCF based on 100 mol % of the dihydric phenol component constituting the polycarbonate.

(3) A copolycarbonate which comprises 20 to 80 mol %, preferably 40 to 75 mol % and more preferably 45 to 65 mol % of BPM and 20 to 80 mol %, preferably 25 to 60 mol % and more preferably 35 to 55 mol % of Bis-TMC based on 100 mol % of the dihydric phenol component constituting the polycarbonate.

These special polycarbonates may be used alone or in combination of two or more. They may be mixed with a commonly used bisphenol A-based polycarbonate.

The production processes and characteristic properties of these special polycarbonates are detailed in, for example, JP-A 6-172508, JP-A 8-27370, JP-A 2001-55435 and JP-A 2002-117580.

Out of the above polycarbonates, polycarbonates whose water absorption coefficient and glass transition temperature (Tg) have been adjusted to the following ranges by controlling their compositions have high hydrolysis resistance and rarely warp after molding. Therefore, they are particularly preferred in fields in which form stability is required.

(i) A polycarbonate having a water absorption coefficient of 0.05 to 0.15%, preferably 0.06 to 0.13% and a Tg of 120 to 180° C., or (ii) a polycarbonate having a Tg of 160 to 250° C., preferably 170 to 230° C. and a water absorption coefficient of 0.10 to 0.30%, preferably 0.13 to 0.30% and more preferably 0.14 to 0.27%.

The water absorption coefficient of a polycarbonate is a value obtained by measuring the moisture content of a disk-like test specimen having a diameter of 45 mm and a thickness of 3.0 mm after the specimen is immersed in 23° C. water for 24 hours in accordance with ISO62-1980. Tg (glass transition temperature) is a value measured with a differential scanning calorimeter (DSC) in accordance with JIS K7121.

As the carbonate precursor may be used a carbonyl halide, diester carbonate or haloformate, as exemplified by phosgene, diphenyl carbonate and dihaloformates of a dihydric phenol.

For the production of an aromatic polycarbonate resin from the above dihydric phenol and the above carbonate precursor by interfacial polymerization, a catalyst, an end-sealing agent and an antioxidant for preventing the oxidation of the dihydric phenol may be optionally used. The aromatic polycarbonate resin used in the present invention includes a branched polycarbonate resin obtained by copolymerizing a polyfunctional aromatic compound having 3 or more functional groups, a polyester carbonate resin obtained by copolymerizing an aromatic or aliphatic (including alicyclic) bifunctional carboxylic acid, a copolycarbonate resin obtained by copolymerizing a bifunctional alcohol (including an alicyclic bifunctional alcohol), and a polyester carbonate resin obtained by copolymerizing the bifunctional carboxylic acid and the bifunctional alcohol. These aromatic polycarbonate resins may be used in combination of two or more.

The branched polycarbonate resin can provide dripping preventing ability to the resin composition of the present invention. Examples of the polyfunctional aromatic compound having 3 or more functional groups used in the branched polycarbonate resin include phloroglucin, phloroglucide, trisphenols such as 4,6-dimethyl-2,4,6-tris(4-hydroxydiphenyl) heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, and trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The amount of the constituent unit derived from the polyfunctional aromatic compound in the branched polycarbonate is preferably 0.01 to 1 mol %, more preferably 0.05 to 0.9 mol % and much more preferably 0.05 to 0.8 mol % based on 100 mol % of the total of the constituent unit derived from the dihydric phenol and the constituent unit derived from the polyfunctional aromatic compound.

In the case of the melt transesterification process in particular, a branched structural unit may be produced as a side reaction. The amount of the branched structural unit is preferably 0.001 to 1 mol %, more preferably 0.005 to 0.9 mol % and much more preferably 0.01 to 0.8 mol % based on 100 mol % of the total of it and the constituent unit derived from the dihydric phenol. The amount of the branched structure can be calculated by $^1$H-NMR measurement.

The aliphatic bifunctional carboxylic acid is preferably α,ω-dicarboxylic acid. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. The bifunctional alcohol is preferably an alicyclic diol such as cyclohexanedimethanol, cyclohexanediol or tricyclodecanedimethanol.

Reaction types such as interfacial polymerization, melt transesterification, carbonate prepolymer solid-phase transesterification and cyclic carbonate compound ring-opening polymerization all of which are processes for producing the polycarbonate-based resin of the present invention are well known through documents and patent publications.

For the production of the resin composition of the present invention, the viscosity average molecular weight (M) of the polycarbonate-based resin is not particularly limited but is preferably $1.0 \times 10^4$ to $5.0 \times 10^4$, more preferably $1.4 \times 10^4$ to $3.0 \times 10^4$ and much more preferably $1.4 \times 10^4$ to $2.4 \times 10^4$.

Satisfactory mechanical properties cannot be obtained from a polycarbonate-based resin having a viscosity average molecular weight lower than $1.0 \times 10^4$. A resin composition obtained from an aromatic polycarbonate resin having a viscosity average molecular weight higher than $5.0 \times 10^4$ is inferior in versatility as it has low flowability at the time of injection molding.

The above polycarbonate-based resin may be obtained by mixing a polycarbonate-based resin having a viscosity average molecular weight outside the above range. Particularly a polycarbonate-based resin having a viscosity average molecular weight higher than the above range ($5.0 \times 10^4$) improves in the entropy elasticity of the resin. As a result, it exhibits high moldability in gas assist molding which is used to mold a resin material into a structural member and foam molding. Moldability is improved more than that of the above branched polycarbonate. As a more preferred embodiment, a polycarbonate-based resin (component A-1-1) (may be referred to as "high-molecular weight component-containing polycarbonate-based resin" hereinafter) consisting of a polycarbonate resin having a viscosity average molecular weight of $7 \times 10^4$ to $3 \times 10^5$ (component A-1-1-1) and an aromatic polycarbonate resin having a viscosity average molecular weight of $1 \times 10^4$ to $3 \times 10^4$ (component A-1-1-2) and having a viscosity average molecular weight of $1.6 \times 10^4$ to $3.5 \times 10^4$ may also be used as the component A.

In the above high-molecular weight component-containing polycarbonate-based resin (component A-1-1), the molecular weight of the component A-1-1-1 is preferably $7 \times 10^4$ to $2 \times 10^5$, more preferably $8 \times 10^4$ to $2 \times 10^5$, much more preferably $1 \times 10^5$ to $2 \times 10^5$ and particularly preferably $1 \times 10^5$ to $1.6 \times 10^5$. The molecular weight of the component A-1-1-2 is preferably $1 \times 10^4$ to $2.5 \times 10^4$, more preferably $1.1 \times 10^4$ to $2.4 \times 10^4$, much more preferably $1.2 \times 10^4$ to $2.4 \times 10^4$ and particularly preferably $1.2 \times 10^4$ to $2.3 \times 10^4$.

The high-molecular weight component-containing polycarbonate-based resin (component A-1-1) can be obtained by mixing together the above components A-1-1-1 and A-1-1-2 in various ratios to achieve the predetermined molecular weight range. The content of the component A-1-1-1 is preferably 2 to 40 wt %, more preferably 3 to 30 wt %, much more preferably 4 to 20 wt % and particularly preferably 5 to 20 wt % based on 100 wt % of the component A-1-1.

To prepare the component A-1-1, (1) a method in which the component A-1-1-1 and the component A-1-1-2 are polymerized independently and mixed together, (2) a method in which an aromatic polycarbonate resin is produced by employing a method of producing an aromatic polycarbonate resin showing a plurality of polymer peaks in a molecular weight distribution chart measured by GPC in the same system to ensure that the aromatic polycarbonate resin satisfies the conditions of the component A-1-1 of the present invention, as typified by the method disclosed by JP-A 5-306336, or (3) a method in which the aromatic polycarbonate resin obtained by the above production method (2) is mixed with the component A-1-1-1 and/or the component A-1-1-2 produced separately may be employed.

As for the viscosity average molecular weight as used in the present invention, the specific viscosity ($\eta_{sp}$) calculated from the following equation is first obtained from a solution prepared by dissolving 0.7 g of the polycarbonate in 100 ml of methylene chloride at 20° C. by using an Ostwald viscometer, and the viscosity average molecular weight M is calculated from the obtained specific viscosity ($\eta_{sp}$) based on the following equation.

Specific viscosity $(\eta_{sp})=(t-t_0)/t_0$

[$t_0$ is the number of seconds required for the dropping of methylene chloride and t is the number of seconds required for the dropping of a sample solution]

$\eta_{sp}/c=[\eta]+0.45 \times [\eta]^2 c$ ([η] represents an intrinsic viscosity)

$[\eta]=1.23 \times 10^{-4} M^{0.83}$ $c=0.7$

The viscosity average molecular weight of the polycarbonate resin in the flame retardant aromatic polycarbonate resin composition of the present invention is calculated as follows. That is, the composition is mixed with methylene chloride in a weight ratio of 1:20 to 1:30 to dissolve soluble matter contained in the composition. The soluble matter is collected by cerite filtration. Thereafter, the solvent contained in the obtained solution is removed. After the removal of the solvent, solid matter is dried completely so as to obtain a methylene chloride-soluble solid. The specific viscosity of a solution prepared by dissolving 0.7 g of the solid in 100 ml of methylene chloride at 20° C. is obtained likewise so as to calculate the viscosity average molecular weight M from the specific viscosity likewise.

(Component B: Polycarbonate-Polydiorganosiloxane Copolymer Resin)

The polycarbonate-polydiorganosiloxane copolymer resin used as the component B of the present invention is a copolymer resin prepared by copolymerizing a dihydric phenol represented by the following formula (1) with a hydroxyaryl-terminated polydiorganosiloxane represented by the following formula (3).

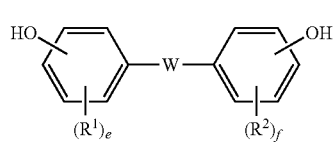
(1)

In the above formula, $R^1$ and $R^2$ are each independently a group selected from the class consisting of halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group and may be the same or different when there are a plurality of $R^1$'s and a plurality of $R^2$'s, "e" and "f" are each an integer of 1 to 4, and W is a single bond or at least one group selected from the class consisting of groups represented by the following formulas (2).

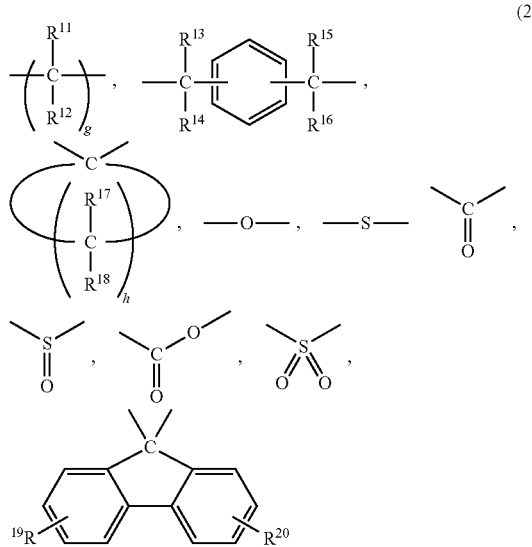
(2)

In the above formulas (2), $R^{11}$, $R^{12}$, $R^{13}$, $R^{14}$, $R^{15}$, $R^{16}$, $R^{17}$ and $R^{18}$ are each independently a group selected from the class consisting of hydrogen atom, alkyl group having 1 to 18 carbon atoms, aryl group having 3 to 14 carbon atoms and aralkyl group having 7 to 20 carbon atoms, $R^{19}$ and $R^{20}$ are each independently a group selected from the class consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, and when there are a plurality of $R^{11}$'s a plurality of $R^{12}$'s, a plurality of $R^{17}$'s and a plurality of $R^{18}$'s, they may be the same or different, "g" is an integer of 1 to 10, and "h" is an integer of 4 to 7.

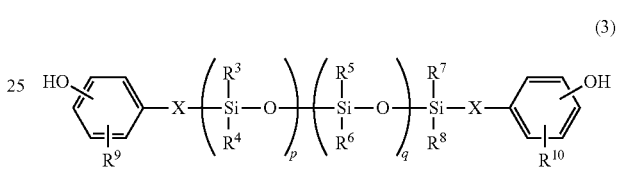
(3)

In the above formula (3), $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms. $R^9$ and $R^{10}$ are each independently a hydrogen atom, halogen atom, alkyl group having 1 to 10 carbon atoms or alkoxy group having 1 to 10 carbon atoms. "p" is a natural number, "q" is 0 or a natural number, (p+q) is a natural number of less than 300, and two X's are divalent aliphatic groups having 2 to 8 carbon atoms.

Examples of the dihydric phenol (I) represented by the formula (1) include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyl diphenol, 4,4'-dihydroxydiphenyl sulfoxide, 4,4'-dihydroxydiphenyl sulfide, 2,2'-dimethyl-4,4'-sulfonyl diphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis (4-hydroxyphenyl)tricyclo[5.2.1.0$^{2,6}$]decane, 4,4'-(1,3-adamantanediyl)diphenol and 1,3-bis(4-hydroxyphenyl)-5,7-dimethyladamantane.

Out of these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene are preferred, and 2,2-bis(4-hydroxyphenyl)propane, 1,1-bis(4-hydroxyphenyl)cyclohexane (BPZ), 4,4'-sulfonyldiphenol and 9,9-bis(4-hydroxy-3-methylphenyl)fluorene are particularly preferred. 2,2-bis(4-hydroxyphenyl)propane having high strength and high durability is most preferred. They may be used alone or in combination of two or more.

The hydroxyaryl-terminated polydiorganosiloxane (II) is easily produced by carrying out the hydrosilylation reaction of an olefinic phenol having an unsaturated carbon-carbon bond, preferably vinyl phenol, 2-allyl phenol, isopropenyl phenol or 2-methoxy-4-allyl phenol to the terminal of a polysiloxane chain having a predetermined polymerization degree. (2-allylphenol)-terminated polydiorganosiloxanes and (2-methoxy-4-allyphenol)-terminated polydiorganosiloxanes are preferred, and (2-allylphenol)-terminated polydimethylsiloxane and (2-methoxy-4-allyphenol)-terminated polydimethylsiloxane are particularly preferred.

The diorganosiloxane polymerization degree (p+q) of the hydroxyaryl-terminatedpolydiorganosiloxane (II) is a natural number of less than 300. When the polymerization degree is not less than 300, the polydiorganosiloxane unit is not uniformly incorporated into the polycarbonate and the content of the polydiorganosiloxane unit in the polymer molecule increases, whereby a polycarbonate containing the unit and a polycarbonate not containing the unit tend to be produced and compatibility between them degrades. As a result, the dispersion of polydiorganosiloxane domains becomes nonuniform, whereby a poor appearance is obtained and satisfactory flame retardancy is not obtained. The diorganosiloxane polymerization degree (p+q) is preferably 10 to 120, more preferably 20 to 115 and much more preferably 30 to 110. Below the lower limit of the above range, satisfactory flame retardancy is hardly obtained, the diameters of the polydiorganosiloxane domains become small, and satisfactory impact resistance is hardly obtained. In the present invention, the polydiorganosiloxane domains are domains containing the polydiorganosiloxane dispersed in the polycarbonate matrix as the main component and may contain another component. As described above, since the structures of the polydiorganosiloxane domains are formed by phase separation from the polycarbonate as a matrix, they are not always composed of only one component.

The content of the polydiorganosiloxane is preferably 0.1 to 50 wt % based on the total weight of the copolymer resin. The content of the polydiorganosiloxane component is more preferably 0.5 to 30 wt % and much more preferably 1 to 20 wt %. Above the lower limit of the above preferred range, the copolymer resin is excellent in impact resistance and flame retardancy and below the upper limit of the preferred range, a stable appearance which is hardly affected by the influence of molding conditions is easily obtained. The polymerization degree of the polydiorganosiloxane and the content of the polydiorganosiloxane can be calculated by $^{1}$H-NMR measurement.

In the present invention, hydroxyaryl-terminated polydiorganosiloxanes (II) may be used alone or in combination of two or more. As long as the production process of the present invention is not disturbed, a comonomer other than the above dihydric phenol (I) and the above hydroxyaryl-terminated polydiorganosiloxane (II) may be used in an amount of not more than 10 wt % based on the total weight of the copolymer.

In the present invention, a mixed solution of a chloroformate compound containing a chloroformate of the dihydric phenol (I) and/or a carbonate oligomer of the dihydric phenol (I) having a terminal chloroformate group is prepared by reacting the dihydric phenol (I) with a chloroformate forming compound such as phosgene or a chloroformate of the dihydric phenol (I) in a mixed solution of a water-insoluble organic solvent and an alkali aqueous solution in advance. Phosgene is preferred as the chloroformate forming compound.

To form the chloroformate compound from the dihydric phenol (I), the whole amount of the dihydric phenol (I) used in the production process of the present invention may be converted into the chloroformate compound at a time, or part of the dihydric phenol (I) may be added as a post-addition monomer to the subsequent interfacial polycondensation reaction as a reaction raw material. The post-addition monomer is added to accelerate the subsequent polycondensation reaction and does not need to be added when not required.

This chloroformate compound forming reaction method is not particularly limited but preferably carried out in a solvent in the presence of an acid binder. A small amount of an antioxidant such as sodium phosphite or hydrosulfide may be further added as required and is preferably added.

The amount of the chloroformate forming compound may be suitably adjusted in consideration of the stoichiometric proportion (equivalent) of the reaction. When phosgene which is a preferred chloroformate forming compound is used, gasified phosgene is preferably blown into the reaction system.

As the above acid binder may be used an alkali metal hydroxide such as sodium hydroxide or potassium hydroxide, an alkali metal carbonate such as sodium carbonate or potassium carbonate, an organic base such as pyridine, or a mixture thereof.

The amount of the acid binder may also be suitably determined in consideration of the stoichiometric proportion (equivalent) of the reaction. More specifically, 2 equivalents or a little more than that of the acid binder is preferably used based on 1 mole (generally, 1 mole is equivalent to 2 equivalents) of the dihydric phenol (I) used to form the chloroformate compound of the dihydric phenol (I).

As the above solvent, various solvents which are inactive to the reaction and used to produce known polycarbonates may be used alone or as a mixture. Typical examples thereof include hydrocarbon solvents such as xylene and halogenated hydrocarbon solvents such as methylene chloride and chlorobenzene. Halogenated hydrocarbon solvents such as methylene chloride are particularly preferably used.

As for the molar ratio of the water-insoluble organic solvent, the amount of the solvent is preferably not less than 8 moles, more preferably not less than 10 moles, much more preferably not less than 12 moles and particularly preferably not less than 14 moles based on 1 mole of the dihydric phenol (I). Although the upper limit is not particularly limited, it is not more than 50 moles from the viewpoints of the size of the apparatus and cost. By setting the molar ratio of the organic solvent to the dihydric phenol (I) to the above range, the average size of the polydiorganosiloxane domains and normalization dispersion are easily controlled to appropriate values.

The pressure in the chloroformate compound forming reaction is not particularly limited and may be normal, increased or reduced pressure. In general, it is advantageous that the reaction should be carried out under normal pressure. The reaction temperature is selected from a range of −20 to 50° C. Since heat is generated by the reaction in many cases, water cooling or ice cooling is desirably carried out. The reaction time is affected by other conditions and cannot be specified unconditionally but generally 0.2 to 10 hours.

The pH range in the chloroformate compound forming reaction can be set by making use of known interfacial reaction conditions and is generally adjusted to not less than 10.

In the present invention, after a mixed solution of a chloroformate compound containing a chloroformate of the dihydric phenol (I) and a carbonate oligomer of the dihydric phenol (I) having a terminal chloroformate group is prepared, the hydroxyaryl-terminated polydiorganosiloxane (II) represented by the formula (3) is added at a rate of not more than 0.01 mol/min based on 1 mole of the dihydric phenol (I) charged to prepare the above mixed solution while the mixed solution is stirred to carry out the interfacial polycondensation of the hydroxyaryl-terminated polydiorganosiloxane (II) and the chloroformate compound so as to obtain a polycarbonate-polydiorganosiloxane copolymer resin.

The polycarbonate-polydiorganosiloxane copolymer resin of the present invention can be changed to a branched polycarbonate copolymer by using a branching agent in combination with the above dihydric phenol-based compound. Examples of the polyfunctional aromatic compound having 3 or more functional groups used for the branched polycarbonate resin include phloroglucin, phloroglucide, trisphenols such as, 4,6-dimethyl-2,4,6-tris(4-hydroxydiphenyl)heptene-2,2,4,6-trimethyl-2,4,6-tris(4-hydroxyphenyl)heptane, 1,3,5-tris(4-hydroxyphenyl)benzene, 1,1,1-tris (4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzyl phenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenonetetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The process for producing the branched polycarbonate copolymer may be one in which a branching agent is contained in the mixed solution during a reaction for forming the chloroformate compound, or one in which a branching agent is added during the interfacial polycondensation reaction after the end of the forming reaction. The content of a carbonate constituent unit derived from the branching agent is preferably 0.005 to 1.5 mol %, more preferably 0.01 to 1.2 mol % and particularly preferably 0.05 to 1.0 mol % based on the total amount of all the carbonate constituent units constituting the copolymer. The amount of the branched structure can be calculated by $^1$H-NMR measurement.

Although the pressure in the polycondensation reaction system may be reduced, normal or increased pressure, the polycondensation reaction can be advantageously carried out under normal pressure or the own pressure of the reaction system. The reaction temperature is selected from a range of −20 to 50° C. Since heat is generated by polymerization in many cases, water cooling or ice cooling is desirably carried out. Since the reaction time differs according to the reaction temperature and other conditions, it cannot be specified unconditionally but generally 0.5 to 10 hours.

According to the circumstances, a polycarbonate copolymer having a desired reduced viscosity [$\eta_{sp/c}$] can be obtained by subjecting the obtained polycarbonate copolymer to a suitable physical treatment (such as mixing or fractionation) and/or a chemical treatment (such as a polymer reaction, crosslinking or partial decomposition).

A polycarbonate-polydiorganosiloxane copolymer resin having desired purity (refining degree) can be collected by subjecting the obtained reaction product (crude product) to various known post-treatments such as separation and refinement.

The viscosity average molecular weight of the polycarbonate-polydiorganosiloxane copolymer resin is preferably $5.0 \times 10^3$ to $5.0 \times 10^4$. The viscosity average molecular weight is more preferably $1.0 \times 10^4$ to $4.0 \times 10^4$, much more preferably $1.5 \times 10^4$ to $3.5 \times 10^4$ and particularly preferably $1.7 \times 10^4$ to $2.5 \times 10^4$. When the viscosity average molecular weight of the polycarbonate-polydiorganosiloxane copolymer resin is lower than $5.0 \times 10^3$, a practical level of mechanical strength is hardly obtained in many fields, and when it is higher than $5.0 \times 10^4$, melt viscosity becomes high and therefore a high molding temperature is required, whereby inconvenience such as the thermal deterioration of the resin tends to occur.

The polydiorganosiloxane content of the polycarbonate-polydiorganosiloxane copolymer resin in the resin composition of the present invention is 0.2 to 0.6 wt %. The upper limit value thereof is preferably 0.55 wt %, more preferably 0.50 wt % and much more preferably 0.45 wt %. The lower limit value is preferably 0.25 wt %, more preferably 0.3 wt % and much more preferably 0.35 wt %. The polydiorganosiloxane content is preferably 0.25 to 0.55 wt %, more preferably 0.3 to 0.5 wt % and much more preferably 0.35 to 0.45 wt %. When the content is lower than 0.2 wt %, satisfactory flame retardancy is not obtained, and when the content is higher than 0.6 wt %, flame retardancy is not obtained as well. The reason that flame retardancy is obtained only when the polydiorganosiloxane content of the polycarbonate-polydiorganosiloxane copolymer resin falls within the above range is assumed as follows. That is, as the polydiorganosiloxane content of the polycarbonate-polydiorganosiloxane copolymer resin increases, the polydiorganosiloxane itself produces a combustion gas to promote combustion, thereby deteriorating flame retardancy. Meanwhile, the polydiorganosiloxane produces the effect of promoting the formation of a carbonized phase during the combustion of a test specimen due to a synergetic effect between it and a silicate mineral, thereby improving a dripping prevention effect and flame retardancy. It is assumed that only when the polydiorganosiloxane content falls within the above range, the effect of improving flame retardancy surpasses the effect of deteriorating flame retardancy, thereby obtaining flame retardancy. The polydiorganosiloxane content of the composition was calculated from the content of PDMS in the polycarbonate-polydiorganosiloxane copolymer resin (PC-PDMS copolymer resin) based on the following equation.

content of PDMS in composition (wt %)={(weight of PDMS in PC-PDMS copolymer resin)/(weight of whole composition)}×100

(Component C: Flame Retardant)

The flame retardant (component C) of the present invention is selected from (i) organic phosphorus-based flame retardants such as monophosphate compounds, phosphate oligomer compounds, phosphonate oligomer compounds, phosphonitrile oligomer compounds and phosphonic acid amide compounds and (ii) organic metal salt-based flame retardants such as organic sulfonic acid alkali (earth) metal salts, boric acid metal salt-based flame retardants and stannic acid metal salt-based flame retardants. By mixing a compound used as a flame retardant, not only flame retardancy is improved but also antistatic properties, flowability, stiffness and heat stability are improved based on the properties of the compound.

(Component C-1: Organic Phosphorus-Based Flame Retardant)

The organic phosphorus-based flame retardant of the present invention is preferably a phosphate compound, particularly preferably an aryl phosphate compound. Since the phosphate compound is effective in improving flame retardancy and has a plasticizing effect, it is advantageous that it can enhance the moldability of the resin composition of the present invention though it degrades heat resistance. Various phosphate compounds which have been known as flame retardants may be used as the phosphate compound. One or more phosphate compounds represented by the following formula (4) are more preferred.

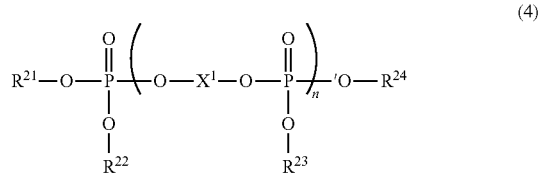
(4)

In the above formula, $X^1$ is a dihydric phenol residue derived from a dihydroxy compound selected from the class consisting of hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone and bis(4-hydroxyphenyl)sulfide, "n" is an integer of 0 to 5, or in the case of a mixture of phosphoric acid esters which differ in "n", "n" is the average value of these, $R^{21}$, $R^{22}$, $R^{23}$ and $R^{24}$ are each independently a monohydric phenol residue derived from an aryl group selected from the class consisting of phenol, cresol, xylenol, isopropylphenol, butylphenol and p-cumylphenyl.

The phosphate compound of the above formula (4) may be a mixture of compounds which differ in "n". In the case of the mixture, the average value "n" is preferably 0.5 to 1.5, more preferably 0.8 to 1.2, much more preferably 0.95 to 1.15 and particularly preferably 1 to 1.14.

Preferred examples of the dihydric phenol deriving $X^1$ in the above formula (4) include resorcinol, bisphenol A and dihydroxydiphenyl, out of which resorcinol and bisphenol A are preferred.

Preferred examples of the monohydric phenol deriving $R^{21}$, $R^{22}$, $R^{23}$ and $R^{24}$ in the above formula (4) include phenol, cresol, xylenol and 2,6-dimethyphenol, out of which phenol and 2,6-dimethylphenol are preferred.

Preferred examples of the phosphate compound of the formula (4) include monophosphate compounds such as triphenyl phosphate and tri(2,6-xylyl)phosphate, phosphate oligomers essentially composed of resorcinol bis(di(2,6-xylyl)phosphate), phosphate oligomers essentially composed of 4,4-dihydroxydiphenyl bis(diphenylphosphate), and phosphoric acid ester oligomers essentially composed of bisphenol A bis(diphenylphosphate). Out of these, phosphate oligomers essentially composed of resorcinol bis(di(2,6-xylyl)phosphate), phosphate oligomers essentially composed of 4,4-dihydroxydiphenyl bis(diphenylphosphate) and phosphoric acid ester oligomers essentially composed of bisphenol A bis(diphenylphosphate) are particularly preferred.

When an organic phosphorus-based flame retardant is used as the flame retardant, the content thereof is 3 to 35 parts by weight, preferably 3 to 25 parts by weight, much more preferably 3.5 to 22.5 parts by weight and particularly preferably 4 to 20 parts by weight based on 100 parts by weight of the total of the components A and B. When the content of the organic phosphorus-based flame retardant is lower than 3 parts by weight, flame retardancy is not obtained and when the content is higher than 35 parts by weight, flame retardancy is not obtained and heat resistance degrades disadvantageously.

(Component C-2: Organic Metal Salt-Based Flame Retardant)

The organic metal salt-based flame retardant is advantageous as heat resistance is almost retained. The organic metal salt-based flame retardant which is most advantageously used in the present invention is selected from sulfonic acid alkali metal salts and sulfonic acid alkali earth metal salts. Out of these, alkali (earth) metal salts of a fluorine-substituted organic sulfonic acid are preferred, and alkali (earth) metal salts of a sulfonic acid having a perfluoroalkyl group are particularly preferred. The number of carbon atoms of the perfluoroalkyl group is 1 to 18, more preferably 1 to 10 and more preferably 1 to 8.

The metal constituting the metal ion of the alkali (earth) metal salt of a fluorine-substituted organic sulfonic acid is an alkali metal or an alkali earth metal. Examples of the alkali metal include lithium, sodium, potassium, rubidium and cesium. Examples of the alkali earth metal include beryllium, magnesium, calcium, strontium and barium. An alkali metal is more preferred. Therefore, the preferred organic metal salt-based flame retardant is an alkali metal salt of a perfluoroalkylsulfonic acid. When the requirement for transparency is higher, rubidium and cesium are preferred out of the above alkali metals. However, as they cannot be used for all purposes and it is difficult to refine them, they may become disadvantageous in terms of cost. Meanwhile, although lithium and sodium are advantageous in terms of cost and flame retardancy, they may become disadvantageous in terms of transparency. In consideration of these, an alkali metal contained in the perfluoroalkylsulfonic acid alkali metal salt may be used for each purpose but a perfluoroalkylsulfonic acid potassium salt having good balance among properties is most preferred in all respects. This potassium salt and a perfluoroalkylsulfonic acid alkali metal salt containing another alkali metal may be used in combination.

Examples of the perfluoroalkylsulfonic acid alkali metal salt include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. Out of these, potassium perfluorobutanesulfonate is particularly preferred.

The above organic metal salt-based flame retardant has a fluoride ion content measured by ion chromatography of preferably not more than 50 ppm, more preferably not more than 20 ppm and much more preferably not more than 10 ppm. As the fluoride ion content becomes lower, flame retardancy and light resistance become higher. The lower limit of the fluoride ion content may be substantially 0 but preferably about 0.2 ppm for practical purposes according to balance between the number of refining steps and the effect. The perfluoroalkylsulfonic acid alkali metal salt having the above fluoride ion content can be refined as follows, for example. The perfluoroalkylsulfonic acid alkali metal salt is dissolved in ion exchange water in a metal salt/ion exchange water weight ratio of 1:2 to 1:10 at 40 to 90° C., preferably 60 to 85° C. The perfluoroalkylsulfonic acid alkali metal salt is produced by a method in which a perfluoroalkylsulfonic acid is neutralized with a carbonate or hydroxide of an alkali metal or a method in which a perfluoroalkylsulfonyl fluoride is neutralized with a carbonate or hydroxide of an alkali metal, preferably by the latter method. The ion exchange water is particularly preferably water having an electric resistance of not less than 18 MΩ·cm. A solution containing the metal salt dissolved therein is stirred at the above temperature for 0.1 to 3 hours, preferably 0.5 to 2.5 hours. Thereafter, the solution is cooled to 0 to 40° C., preferably 10 to 35° C. A crystal is precipitated by cooling. The precipitated crystal is extracted by filtration. Thereby, a more preferred refined perfluoroalkylsulfonic acid alkali metal salt is produced.

When a fluorine-substituted organic sulfonic acid alkali (earth) metal salt is used as the flame retardant, the amount thereof is 0.005 to 5 parts by weight, preferably 0.01 to 1 part by weight and more preferably 0.015 to 0.5 part by weight based on 100 parts by weight of the total of the components A and B. As the above range is more preferred, effects expected from the mixing of the fluorine-substituted organic sulfonic acid alkali (earth) metal salt, for example, flame retardancy and antistatic properties are obtained.

An organic metal salt-based flame retardant other than the fluorine-substituted organic sulfonic acid alkali (earth) metal salt is preferably a metal salt of an organic sulfonic acid containing no fluorine atom. Examples of the metal salt include alkali metal salts of an aliphatic sulfonic acid, alkali earth metal salts of an aliphatic sulfonic acid, alkali metal salts of an aromatic sulfonic acid and alkali earth metal salts of an aromatic sulfonic acid (all of them do not contain a fluorine atom).

The metal salts of an aliphatic sulfonic acid are preferably alkali (earth) metal salts of an alkylsulfonic acid which may be used alone or in combination of two or more (the term "alkali (earth) metal salt" means either an alkali metal salt or an alkali earth metal salt). Preferred examples of the alkanesulfonic acid used in the alkylsulfonic acid alkali (earth) metal salts include methanesulfonic acid, ethanesulfonic acid, propanesulfonic acid, butanesulfonic acid, methylbutanesulfonic acid, hexanesulfonic acid, heptanesulfonic acid and octanesulfonic acid, all of which may be used alone or in combination of two or more.

The aromatic sulfonic acid used in the aromatic sulfonic acid alkali (earth) metal salts is at least one acid selected from the class consisting of a sulfonic acid of a monomer-like or polymer-like aromatic sulfide, sulfonic acid of an aromatic carboxylic acid and an ester, sulfonic acid of a monomer-like or polymer-like aromatic ether, sulfonic acid of an aromatic sulfonate, monomer-like or polymer-like aromatic sulfonic acid, monomer-like or polymer-like aromatic sulfonesulfonic acid, sulfonic acid of an aromatic ketone, heterocyclic sulfonic acid, sulfonic acid of an aromatic sulfoxide and condensate formed by the methylene type bonding of an aromatic sulfonic acid. They may be used alone or in combination of two or more.

Examples of the aromatic sulfonic acid alkali (earth) metal salt include disodium diphenylsulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenyleneoxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate, lithium poly(2-fluoro-6-butylphenyleneoxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, formalin condensate of sodium naphthalenesulfonate, and formalin condensate of sodium anthracenesulfonate.

Out of these organic sulfonic acid metal salts containing no fluorine atom, aromatic sulfonic acid alkali (earth) metal salts are preferred, and potassium salts are particularly preferred. When an aromatic sulfonic acid alkali (earth) metal salt is used as the flame retardant, the content thereof is 0.005 to 5 parts by weight, preferably 0.01 to 1 part by weight and more preferably 0.015 to 0.5 part by weight based on 100 parts by weight of the total of the components A and B.

(Component D: Silicate Mineral)

The silicate mineral used as component D of the present invention is a mineral comprising at least a metal oxide component and a $SiO_2$ component, for example, preferably orthosilicate, disilicate, cyclic silicate or chain silicate. The silicate mineral as the component D takes a crystal form, and the shape of the crystal may be fibrous or lamellar.

The silicate mineral as the component D may be any compound selected from a composite oxide, an oxyacid salt (composed of an ion lattice) and a solid solution. The composite oxide may be either a combination of at least two oxides or a combination of at least two selected from oxides and oxyacid salts. The solid solution may be either a solid solution of at least two metal oxides or a solid solution of at least two oxyacid salts.

The silicate mineral as the component D may be a hydrate. The form of crystal water in the hydrate may be Si—OH contained as a hydrogen silicate ion, a hydroxy ion ($OH^-$) contained for a metal cation, or an $H_2O$ molecule contained in the space of the structure.

The silicate mineral as the component D may be an artificially synthesized product corresponding to a natural product. As the artificially synthesized product, silicate minerals obtained by conventionally known methods such as synthesizing methods making use of a solid reaction, hydrothermal reaction and super high-pressure reaction may be used.

Examples of the silicate mineral in the metal oxide component (MO) are given below. Terms within parentheses are the names of minerals comprising a silicate mineral as the main component and mean that compounds within parentheses may be used as given metal salts.

Silicate minerals containing $K_2O$ include $K_2O.SiO_2$, $K_2O.4SiO_2.H_2O$, $K_2O.Al_2O_3.2SiO_2$ (kalsilite), $K_2O.Al_2O_3.4SiO_2$ (leucite) and $K_2O.Al_2O_3.6SiO_2$ (orthoclase).

Silicate minerals containing $Na_2O$ include $Na_2O.SiO_2$ and hydrate thereof, $Na_2O.2SiO_2$, $2Na_2O.SiO_2$, $Na_2O.4SiO_2$, $Na_2O.3SiO_2.3H_2O$, $Na_2O.Al_2O_3.2SiO_2$, $Na_2O.Al_2O_3.4SiO_2$ (jadeite), $2Na_2O.3CaO.5SiO_2$, $3Na_2O.2CaO.5SiO_2$ and $Na_2O.Al_2O_3.6SiO_2$ (albite).

Silicate minerals containing $Li_2O$ include $Li_2O.SiO_2$, $2Li_2O.SiO_2$, $Li_2O.SiO_2.H_2O$, $3Li_2O.2SiO_2$, $Li_2O.Al_2O_3.4SiO_2$ (petalite), $Li_2O.Al_2O_3.2SiO_2$ (eucryptite), and $Li_2O.Al_2O_3.4SiO_4$ (spodumene).

Silicate minerals containing $BaO$ include $BaO.SiO_2$, $2BaO.SiO_2$, $BaO.Al_2O_3.2SiO_2$ (celsian) and $BaO.TiO_2.3SiO_2$ (bentonite).

Silicate minerals containing $CaO$ include $3CaO.SiO_2$ (ehrlite of cement clinker mineral), $2CaO.SiO_2$ (belite of cement clinker mineral), $2CaO.MgO.2SiO_2$ (akermanite), $2CaO.Al_2O_3.SiO_2$ (gehlenite), solid solution of akermanite and gehlenite (melilite), $CaO.SiO_2$ (wollastonite (including both α-type and β-type)), $CaO.MgO.2SiO_2$ (diopside), $CaO.MgO.SiO_2$ (monticellite), $3CaO.MgO.2SiO_2$ (merwinite), $CaO.Al_2O_3.2SiO$ (anorthite), tobermorite group hydrates such as $5CaO.6SiO_2.5H_2O$ (tobermorite, $5CaO.6SiO_2.9H_2O$ is also included), wollastonite group hydrates such as $2CaO.SiO_2.H_2O$ (hillebrandite), xonotlite group hydrates such as $6CaO.6SiO_2.H_2O$ (xonotlite), gyrolite group hydrates such as $2CaO.SiO_2.2H_2O$ (gyrolite), $CaO.Al_2O_3.2SiO_2.H_2O$ (lawsonite), $CaO.FeO.2SiO_2$ (hedenbergite), $3CaO.2SiO_2$ (kilchoanite), $3CaO.Al_2O_3.3SiO_2$ (grossular), $3CaO.Fe_2O_3.3SiO_2$ (andradite), $6CaO.4Al_2O_3.FeO.SiO_2$ (pleochroaite), clinozoisite, piemontite, allenite, vesuvianite, axinite, scawtite and augite.

Further, Portland cement is given as a silicate mineral containing CaO. The type of Portland cement is not particularly limited and any one of ordinary, early-strength, ultra-high-early-strength, moderate-heat, sulfate-resistant and white Portland cements may be used. Mixed cements such as blast-furnace cement, silica cement and fly ash cement may also be used as the component B.

Other silicate minerals containing CaO include blast furnace slag and ferrite.

Silicate minerals containing $ZnO$ include $ZnO.SiO_2$, $2ZnO.SiO_2$ (troostite) and $4ZnO.2SiO_2.H_2O$ (hemimorphite).

Silicate minerals containing $MnO$ include $MnO.SiO_2$, $2MnO.SiO_2$, $CaO.4MnO.5SiO_2$ (rhodonite), and kozulite.

Silicate minerals containing $FeO$ include $FeO.SiO_2$ (ferrosilite), $2FeO.SiO_2$ (fayalite), $3FeO.Al_2O_3.3SiO_2$ (almandine) and $2CaO.5FeO.8SiO_2.H_2O$ (ferroactinolite).

Silicate minerals containing $CoO$ include $CoO.SiO_2$ and $2CoO.SiO_2$.

Silicate minerals containing $MgO$ include $MgO.SiO_2$ (steatite, enstatite), $2MgO.SiO_2$ (forsterite), $3MgO.Al_2O_3.3SiO_2$ (pyrope), $2MgO.2Al_2O_3.5SiO_2$ (cordierite), $2MgO.3SiO_2.5H_2O$, $3MgO.4SiO_2.H_2O$ (talc), $5MgO.8SiO_2.9H_2O$ (attaparugite), $4MgO.6SiO_2.7H_2O$ (sepiolite), $3MgO.2SiO_2.2H_2O$ (chrysolite), $5MgO.2CaO.8SiO_2.H_2O$ (tremolite), $5MgO.Al_2O_3.3SiO_2.4H_2O$ (chlorite), $K_2O.6MgO.Al_2O_3.6SiO_2.2H_2O$ (phlogopite), $Na_2O.3MgO.3Al_2O_3.8SiO_2.H_2O$ (glaucophane), magnesium tourmaline, anthophyllite, cummingtonite, vermiculite and smectite.

Silicate minerals containing $Fe_2O_3$ include $Fe_2O_3.SiO_2$.

Silicate minerals containing $ZrO_2$ include $ZrO_2.SiO_2$ (zircon) and AZS refractory.

Silicate minerals containing $Al_2O_3$ include $Al_2O_3.SiO_2$ (sillimanite, andalusite, kyanite), $2Al_2O_3.SiO_2$, $Al_2O_3.3SiO_2$, $3Al_2O_3.2SiO_2$ (mullite), $Al_2O_3.2SiO_2.2H_2O$ (kaolinite), $Al_2O_3.4SiO_2.H_2O$ (pyrophyllite), $Al_2O_3.4SiO_2.H_2O$ (bentonite), $K_2O.3Na_2O.4Al_2O_3.8SiO_2$ (nepheline), $K_2O.3Al_2O_3.6SiO_2.2H_2O$ (mascovite, sericite), $K_2O.6MgO.Al_2O_3.6SiO_2.2H_2O$ (phlogopite), zeolite, synthetic fluorophlogopite and biotite.

Out of the above silicate minerals, mica, talc and wollastonite are particularly preferred (Talc)

Talc in the present invention is hydrous magnesium silicate in terms of chemical composition, generally represented by the chemical formula $4SiO_2.3MgO.2H_2O$ and a flaky particle having a lamellar structure and comprises 56 to 65 wt % of $SiO_2$, 28 to 35 wt % of MgO and about 5 wt % of $H_2O$. As other trace components, it comprises 0.03 to 1.2 wt % of $Fe_2O_3$, 0.05 to 1.5 wt % of $Al_2O_3$, 0.05 to 1.2 wt % of CaO, not more than 0.2 wt % of $K_2O$ and not more than 0.2 wt % of $Na_2O$. As for the particle diameter of talc, the average particle diameter measured by a precipitation method is preferably 0.1 to 15 μm, more preferably 0.2 to 12 much more preferably 0.3 to 10 μm and particularly preferably 0.5 to 5 μm. It is particularly preferred to use talc having a bulk density of not less than 0.5 (g/cm$^3$) as a raw material. The average particle diameter of talc means D50 (median diameter in particle size distribution) measured by an X-ray transmission method which is one of liquid-phase precipitation methods. Examples of the apparatus for this measurement include the Sedigraph5100 of Micromeritics Japan.

The method of milling talc ore is not particularly limited, and axial-flow milling, annular milling, roll milling, ball milling, jet milling and container rotation type compression shearing milling methods may be used. Further, talc which has been classified by a classifier to have a uniform particle size distribution after milling is preferred. The classifier is not particularly limited and may be an impactor type inertia force classifier such as variable impactor, Coanda effect-use inertia force classifier such as elbow jet, or centrifugal classifier such as multi-stage cyclone separator, microplex classifier, dispersion separator, accucut classifier, turbo classifier, turboplex classifier, micron separator or super separator.

Further, talc which is agglomerated is preferred from the viewpoint of handling ease and production processes thereof include one making use of deaeration compression and one making use of compression with a sizing agent. The process making use of deaeration compression is preferred because it is simple and prevents an unrequired sizing agent resin component from being contained in the resin composition of the present invention.

(Mica)

Mica having an average particle diameter measured by a micro-track laser diffraction method of 10 to 100 μm may be preferably used. The average particle diameter is more preferably 20 to 50 μm. When the average particle diameter of mica is smaller than 10 μm, the stiffness improving effect becomes unsatisfactory and when the average particle diameter is larger than 100 μm, the stiffness improving effect becomes unsatisfactory as well and mechanical strength such as impact resistance sharply drops disadvantageously. Mica having a thickness actually measured by observation through an electron microscope of 0.01 to 1 µm may be preferably used. The thickness is more preferably 0.03 to 0.3 µm. The aspect ratio of mica is preferably 5 to 200 and more preferably 10 to 100. Mica used is preferably muscovite mica having a Mohs hardness of about 3. Muscovite mica has higher stiffness and higher strength than other mica such as phlogopite mica and attains the object of the present invention at a higher level. As the method of milling mica, both dry and wet milling methods may be employed. The dry milling method is inexpensive and commonly used whereas the wet milling method is effective in milling mica finely and thinly with the result that the effect of improving the stiffness of the resin composition becomes profound.

(Wollastonite)

The fiber diameter of wollastonite is preferably 0.1 to 10 µm, more preferably 0.1 to 5 µm and much more preferably 0.1 to 3 µm. The aspect ratio (average fiber length/average fiber diameter ratio) of wollastonite is preferably not less than 3. The upper limit of the aspect ratio is not more than 30. As for the fiber diameter, a reinforcing filler is observed through an electron microscope to obtain the fiber diameter of each fiber so as to calculate the number average fiber diameter from the measurement values. The reason for the use of the electron microscope is that it is difficult to measure the level of size to be measured accurately with an optical microscope. A filler to be measured for fiber diameter is chosen at random from an image obtained by observing through the electron microscope and fiber diameters are measured at positions close to the center portion of the filler to calculate the number average fiber diameter from the obtained measurement values. The magnification of the microscope is about 1,000×, and the number of fibers to be measured is not less than 500, preferably 500 to 600 from the viewpoint of work efficiency. As for the measurement of the average fiber length, the filler is observed through an optical microscope to obtain the length of each fiber so as to calculate the number average fiber length from the measurement values. For observation through the optical microscope, a sample in which fillers are dispersed so well that they do not overlap with one another is first prepared. Observation is carried out with a 20-power objective lens, and this observed image is input into a CCD camera having about 250,000 pixels as image data. The fiber length is calculated from this obtained image data by using an image analyzing apparatus and a program for obtaining the maximum distance between two points of the image data. Under the above conditions, the size of each pixel is equivalent to a length of 1.25 µm, and the number of the measured fibers is not less than 500, preferably 500 to 600 from the viewpoint of work efficiency.

It is preferred that iron contained in the raw material ore and iron contained by the abrasion of the apparatus when the raw material ore is milled should be removed as much as possible by a magnetic ore separator in order to fully reflect the whiteness of the wollastonite of the present invention upon the resin composition. The iron content of wollastonite reduced by the magnetic ore separator is preferably not more than 0.5 wt % in terms of $Fe_2O_3$.

Although it is preferred that the silicate mineral, preferably mica, talc or wollastonite should not be surface treated, it may be surface treated with a surface treating agent such as a silane coupling agent, higher fatty acid ester or wax. Further, it may be granulated with a sizing agent such as a resin, higher fatty acid ester or wax.

The content of the component D is 0.1 to 30 parts by weight, preferably 0.15 to 25 parts by weight and more preferably 0.2 to 20 parts by weight based on 100 parts by weight of the total of the components A and B. When the content of the component D is lower than 0.1 part by weight, satisfactory flame retardancy is not obtained. When the content is higher than 30 parts by weight, impact resistance is greatly lost, resulting in a poor appearance such as a silver streak.

(Component E: Dripping Inhibitor)

The resin composition of the present invention comprises a dripping inhibitor (component E). When the resin composition comprises this dripping inhibitor, high flame retardancy can be obtained without impairing the physical properties of a molded article.

The dripping inhibitor as the component E is a fluorine-containing polymer having fibril formability. Examples of the polymer include polytetrafluoroethylene, tetrafluoroethylene copolymers such as tetrafluoroethylene/hexafluoropropylene copolymer, partially fluorinated polymers as disclosed in U.S. Pat. No. 4,379,910, and polycarbonate resins produced from a fluorinated diphenol. Out of these, polytetrafluoroethylene (may be abbreviated as "PTFE" hereinafter) is preferred.

PTFE having fibril formability has an extremely high molecular weight and tends to become fibrous through the bonding of PTFE molecules by an external function such as shearing force. The molecular weight of PTFE is 1,000,000 to 10,000,000 and more preferably 2,000,000 to 9,000,000 in terms of number average molecular weight obtained from its standard specific gravity. PTFE in a solid form or aqueous dispersion form may be used. A mixture of PTFE having fibril formability and another resin may also be used to improve dispersibility in a resin and obtain excellent flame retardancy and mechanical properties.

Commercially products of PTFE having fibril formability include the Teflon (registered trademark) 6J of Du Pont-Mitsui Fluorochemicals Co., Ltd. and the Polyflon MPA FA500 and F-201L of Daikin Industries, Ltd. Commercially available products of the PTFE aqueous dispersion include the Fluon AD-1 and AD-936 of Asahi ICI Fluoropolymers Co., Ltd., the Fluon D-1 and D-2 of Daikin Industries, Ltd. and the Teflon (registered trademark) 30J of Du Pont-Mitsui Fluorochemicals Co., Ltd.

The PTFE mixture may be produced by (1) a method in which an aqueous dispersion of PTFE and an aqueous dispersion or solution of an organic polymer are mixed together and co-precipitation is carried out to obtain a coaggregated mixture (disclosed by JP-A 60-258263 and JP-A 63-154744), (2) a method in which an aqueous dispersion of PTFE and dried organic polymer particles are mixed together (disclosed by JP-A 4-272957), (3) a method in which an aqueous dispersion of PTFE and an organic polymer particle solution are uniformly mixed together and media are removed from the mixture at the same time (disclosed by JP-A 06-220210 and JP-A 08-188653), (4) a method in which a monomer for forming an organic polymer is polymerized in an aqueous dispersion of PTFE (disclosed by JP-A 9-95583), or (5) a method in which an aqueous dispersion of PTFE and an dispersion of an organic polymer are uniformly mixed together and a vinyl-based monomer is polymerized in the mixed dispersion to obtain a mixture (disclosed by JP-A 11-29679). Commercially available products of the PTFE mixture include the Metablen A3800 (trade name) of Mitsubishi Rayon Co., Ltd. and the BLENDEX B449 (trade name) of GE Specialty Chemicals.

The content of PTFE in the mixture is preferably 1 to 60 wt % and more preferably 5 to 55 wt % based on 100 wt % of the PTFE mixture. When the content of PTFE falls within the above range, the high dispersibility of PTFE can be achieved. The above amount of the component E indicates the net amount of the dripping inhibitor and the net amount of PTFE in the case of the PTFE mixture.

The content of the dripping inhibitor is 0.1 to 3 parts by weight, preferably 0.15 to 2 parts by weight and more preferably 0.2 to 1 part by weight based on 100 parts by weight of the total of the components A and B. When the content of the dripping inhibitor falls below the above range, flame retardancy becomes unsatisfactory. When the content of the dripping inhibitor exceeds the above range, PTFE precipitates on the surface of a molded article, resulting in a poor appearance and a rise in the cost of the resin composition disadvantageously.

The styrene monomer used in the organic polymer used in the polytetrafluoroethylene mixture of the present invention is styrene which may be substituted by at least one group selected from the class consisting of alkyl group having 1 to 6 carbon atoms, alkoxy group having 1 to 6 carbon atoms and halogen. Examples of the styrene monomer include ortho-methylstyrene, meta-methylstyrene, para-methylstyrene, dimethylstyrene, ethyl-styrene, para-tert-butylstyrene, methoxystyrene, fluorostyrene, monobromostyrene, dibromostyrene, tribromostyrene, vinyl xylene and vinyl naphthalene. These styrene monomers may be used alone or in combination of two or more.

The acrylic monomer used in the organic polymer used in the polytetrafluoroethylene mixture of the present invention includes a (meth)acrylate derivative which may be substituted. Examples of the acrylic monomer include (meth)acrylate derivatives which may be substituted by at least one group selected from the class consisting of alkyl group having 1 to 20 carbon atoms, cycloalkyl group having 3 to 8 carbon atoms, aryl group and glycidyl group, such as (meth)acrylonitrile, methyl (meth)acrylate, ethyl (meth)acrylate, propyl (meth)acrylate, butyl (meth)acrylate, amyl (meth)acrylate, hexyl (meth)acrylate, 2-ethylhexyl (meth)acrylate, cyclohexyl (meth)acrylate, octyl (meth)acrylate, dodecyl (meth)acrylate, phenyl (meth)acrylate, benzyl (meth)acrylate and glycidyl (meth)acrylate, maleimides which may be substituted by an alkyl group having 1 to 6 carbon atoms or aryl group, such as meleimide, N-methyl-maleimide and N-phenyl-maleimide, maleic acid, phthalic acid and itaconic acid. The above acrylic monomers may be used alone or in combination of two or more. Out of these, (meth)acrylonitrile is particularly preferred.

The amount of the acrylic monomer derived unit contained in the organic polymer is 8 to 11 parts by weight, preferably 8 to 10 parts by weight and more preferably 8 to 9 parts by weight based on 100 parts by weight of the styrene monomer derived unit. When the amount of the acrylic monomer derived unit is smaller than 8 parts by weight, strength may degrade and when the amount is larger than 11 parts by weight, the surface appearance of a molded article may deteriorate.

The polytetrafluoroethylene mixture of the present invention has a residual water content of preferably not more than 0.5 wt %, more preferably 0.2 to 0.4 wt % and much more preferably 0.1 to 0.3 wt %. When the residual water content is higher than 0.5 wt %, it may have an adverse effect upon flame retardancy.

Coated branched PTFE may be used as the dripping inhibitor in the present invention.

The coated branched PTFE is a polytetrafluoroethylene mixture of branched polytetrafluoroethylene particles and an organic polymer and has a coating layer made of the organic polymer, preferably a polymer containing a styrene monomer derived unit and/or an acrylic monomer derived unit, on the exterior of branched polytetrafluoroethylene. The coating layer is formed on the surface of branched polytetrafluoroethylene. Also, the coating layer preferably contains a copolymer of a styrene monomer and an acrylic monomer.

The polytetrafluoroethylene contained in the coated branched PTFE is branched polytetrafluoroethylene. When the contained polytetrafluoroethylene is not branched polytetrafluoroethylene, the dripping preventing effect becomes unsatisfactory if the addition of polytetrafluoroethylene is small. The branched polytetrafluoroethylene is particulate with a particle diameter of preferably 0.1 to 0.6 µm, more preferably 0.3 to 0.5 µm and much more preferably 0.3 to 0.4 µm. When the particle diameter is smaller than 0.1 µm, a molded article is superior in surface appearance but it is difficult to acquire commercially available polytetrafluoroethylene having a particle diameter smaller than 0.1 µm. When the particle diameter is larger than 0.6 µm, the surface appearance of a molded article becomes poor. The number average molecular weight of the polytetrafluoroethylene used in the present invention is preferably $1 \times 10^4$ to $1 \times 10^7$ and more preferably $2 \times 10^6$ to $9 \times 10^6$. In general, polytetrafluoroethylene having a high molecular weight is more preferred from the viewpoint of stability. It may be in a powder or dispersion form.

The content of the branched polytetrafluoroethylene in the coated branched PTFE is preferably 20 to 60 parts by weight, more preferably 40 to 55 parts by weight, much more preferably 47 to 53 parts by weight, particularly preferably 48 to 52 parts by weight and most preferably 49 to 51 parts by weight based on 100 parts by weight of the total weight of the coated branched PTFE. When the content of the branched polytetrafluoroethylene falls within the above range, the high dispersibility of the branched polytetrafluoroethylene can be obtained.

(Component F: Styrene Resin)

The flame retardant resin composition of the present invention may comprise a styrene resin as the component F. Since this styrene resin has high moldability and appropriate heat resistance and flame retardancy, it is a preferred thermoplastic resin so as to keep good balance among these characteristic properties.

The styrene resin is a homopolymer or copolymer of an aromatic vinyl compound, or a polymer obtained by copolymerizing the aromatic vinyl compound with at least one selected from another vinyl monomer and a rubber-like polymer copolymerizable with the aromatic vinyl compound as required.

The aromatic vinyl compound is particularly preferably styrene. The other vinyl monomer copolymerizable with the aromatic vinyl compound is preferably a vinyl cyanide compound or a (meth)acrylic acid ester compound. Acrylonitrile is particularly preferred as the vinyl cyanide compound and methyl methacrylate is particularly preferred as the (meth)acrylic acid ester compound.

Examples of the other vinyl monomer copolymerizable with the aromatic vinyl compound except for the vinyl cyanide compound and the (meth)acrylic acid ester compound include epoxy group-containing methacrylic acid esters such as glycidyl methacrylate, maleimide-based monomers such as maleimide, N-methylmaleimide and N-phenylmaleimide, and α,β-unsaturated carboxylic acids such as acrylic acid, methacrylic acid, maleic acid, maleic anhydride, phthalic acid and itaconic acid, and anhydrides thereof.

Examples of the above rubber-like polymer copolymerizable with the aromatic vinyl compound include polybutadiene, polyisoprene, diene-based copolymers (such as styrene.butadiene random copolymer and block copolymer, acrylonitrile.butadiene copolymer, and copolymer of a (meth)acrylic acid alkyl ester and butadiene), copolymers of ethylene and an α-olefin (such as ethylene.propylene random copolymer and block copolymer and ethylene.butene random copolymer and block copolymer), copolymers of ethylene and an unsaturated carboxylic acid ester (such as ethylene.methacrylate copolymer and ethylene.butyl acrylate copolymer), copolymers of ethylene and an aliphatic vinyl (such as ethylene.vinyl acetate copolymer), terpolymers of ethylene, propylene and a conjugated diene (such as ethylene.propylene-hexadiene copolymer), acrylic rubbers (such as polybutyl acrylate, poly(2-ethylhexyl acrylate) and copolymer of butyl acrylate and 2-ethylhexyl acrylate), and silicone-based rubbers (such as polyorganosiloxane rubber, IPN type rubber comprising a polyorganosiloxane rubber component and a polyalkyl (meth)acrylate rubber component; that is, IPN type rubber having a structure that two rubber components are intertwined with each other so that they cannot be separated from each other and comprising a polyorganosiloxane rubber component and a polyisobutylene rubber component).

Examples of the above styrene-based resin include styrene-based resins such as polystyrene resin, HIPS resin, MS resin, ABS resin, AS resin, AES resin, ASA resin, MBS resin, MABS resin, MAS resin and SMA resin, (hydrogenated) styrene-butadiene-styrene copolymer resin and (hydrogenated) styrene-isoprene-styrene copolymer resin. The expression (hydrogenated) means both hydrogenated resin and non-hydrogenated resin. MS resin is a copolymer resin comprising methyl methacrylate and styrene as main components, AES resin is a copolymer resin comprising acrylonitrile, ethylene-propylene rubber and styrene as main components, ASA resin is a copolymer resin comprising acrylonitrile, styrene and acrylic rubber as main components, MABS resin is a copolymer resin comprising methyl methacrylate, acrylonitrile, butadiene and styrene as main components, MAS resin is a copolymer resin comprising methyl methacrylate, acrylic rubber and styrene as main components, and SMA resin is a copolymer resin comprising styrene and maleic anhydride (MA) as main components.

The styrene resin may have high stereoregularity like syndiotactic polystyrene due to the use of a catalyst such as a metallocene catalyst at the time of production. Further, according to the circumstances, a polymer and a copolymer having a narrow molecular weight distribution, a block copolymer, and a polymer and a copolymer having high stereoregularity, all of which are obtained by anion living polymerization or radical living polymerization, may also be used.

Out of these, acrylonitrile.styrene copolymer resin (AS resin) and acrylonitrile.butadiene.styrene copolymer resin (ABS resin) are preferred. Styrene-based polymers may be used in combination of two or more.

The AS resin used in the present invention is a thermoplastic copolymer obtained by copolymerizing a vinyl cyanide compound with an aromatic vinyl compound. Acrylonitrile is particularly preferably used as the vinyl cyanide compound. Styrene and α-methylstyrene are particularly preferably used as the aromatic vinyl compound. As for the ratio of these components in the AS resin, the content of the vinyl cyanide compound is preferably 5 to 50 wt % and more preferably 15 to 35 wt % and the content of the aromatic vinyl compound is preferably 95 to 50 wt % and more preferably 85 to 65 wt % based on 100 wt % of the total. Further, the above other copolymerizable vinyl-based compound may be mixed with these vinyl compounds. The content of the vinyl-based compound in the AS resin is preferably not more than 15 wt %. Conventionally known initiators and chain transfer agents which are used in the reaction may be used as required.

The AS resin may be produced by any one of bulk polymerization, suspension polymerization and emulsion polymerization, preferably bulk polymerization. Copolymerization may be carried out in a single stage or multiple stages. The reduced viscosity of the AS resin is preferably 0.2 to 1.0 dl/g and more preferably 0.3 to 0.5 dl/g. The reduced viscosity is obtained by measuring a solution prepared by weighing 0.25 g of the AS resin and dissolving it in 50 ml of dimethylformamide over 2 hours with an Ubbellohde viscometer at 30° C. The viscometer having a solvent flow time of 20 to 100 seconds is used. The reduced viscosity is obtained from a solvent flow time ($t_0$) and a solution flow time (t) based on the following equation.

$$\text{Reduced viscosity } (\eta_{sp}/C) = \{(t/t_0) - 1\}/0.5$$

When the reduced viscosity is lower than 0.2 dl/g, impact resistance degrades and when the reduced viscosity is higher than 1.0 dl/g, flowability degrades.

The ABS resin used in the present invention is a mixture of a thermoplastic graft copolymer obtained by graft polymerizing a vinyl cyanide compound and an aromatic vinyl compound with a diene-based rubber component and a copolymer of a vinyl cyanide compound and an aromatic vinyl compound. The diene-based rubber component forming this ABS resin is rubber having a glass transition temperature of −30° C. or lower such as polybutadiene, polyisoprene or styrene-butadiene copolymer, and the content thereof is preferably 5 to 80 wt %, more preferably 8 to 50 wt % and particularly preferably 10 to 30 wt % based on 100 wt % of the ABS resin component. Acrylonitrile may be particularly preferably used as the vinyl cyanide compound to be graft polymerized with the diene-based rubber component. Styrene and α-methylstyrene may be particularly preferably used as the aromatic vinyl compound to be graft polymerized with the diene-based rubber component. The content of the component to be graft polymerized with the diene-based rubber component is preferably 95 to 20 wt % and particularly preferably 50 to 90 wt % based on 100 wt % of the ABS resin component. Preferably, the content of the vinyl cyanide compound is 5 to 50 wt % and the content of the aromatic vinyl compound is 95 to 50 wt % based on 100 wt % of the total of the vinyl cyanide compound and the aromatic vinyl compound. Methyl (meth)acrylate, ethyl acrylate, maleic anhydride or N-substituted maleimide may be used as part of the component to be graft polymerized with the above diene-based rubber component, and the content thereof is preferably not more than 15 wt % based on the ABS resin component. Conventionally known initiators, chain transfer agents and emulsifiers may be used in the reaction as required.

The particle diameter of the rubber component of the ABS resin of the present invention is preferably 0.1 to 5.0 μm, more preferably 0.15 to 1.5 μm and particularly preferably 0.2 to 0.8 μm. The rubber component may have a particle size distribution with one mountain or two or more mountains, and the rubber component may have a structure that the particles form a single phase or a salami structure that an occluded phase is existent around rubber particles in the morphology.

It has been known that the ABS resin contains a vinyl cyanide compound and an aromatic vinyl compound all of which are not graft polymerized with the diene-based rubber component. The ABS resin of the present invention may contain free polymer components which are produced during polymerization. The reduced viscosity (30° C.) of a copolymer of a free vinyl cyanide compound and a free aromatic vinyl compound is preferably 0.2 to 1.0 dl/g and more preferably 0.3 to 0.7 dl/g when measured by the method described above.

The total amount of the graft polymerized vinyl cyanide compound and aromatic vinyl compound is preferably 20 to 200% and more preferably 20 to 70% based on the diene-based rubber component in terms of graft ratio (wt %).

The ABS resin may be produced by any one of bulk polymerization, suspension polymerization and emulsion polymerization, preferably bulk polymerization. Typical examples of the bulk polymerization include continuous bulk polymerization (so-called "Toray process") described in Chemical Engineering, Vol. 48, No. 6, p. 415 (1984) and continuous bulk polymerization process (so-called "Mitsui Toatsu process") described in Chemical Engineering Vol. 53, No. 6, p. 423 (1989). Any one of the ABS resins produced by the above processes is preferably used as the ABS resin of the present invention. Copolymerization may be carried out in a single stage or multiple stages. A blend of the ABS resin obtained by any one of the above processes and a vinyl compound polymer obtained by copolymerizing an aromatic vinyl compound with a vinyl cyanide compound separately may also be preferably used. An ABS resin containing no lubricant (ethylenebis(stearic acid amid) (EBS)) exhibits more excellent flame retardancy.

The above AS resin and the above ABS resin whose alkali (earth) metal content has been reduced are more preferred from the viewpoints of heat stability and hydrolysis resistance. The content of the alkali (earth) metal in the styrene-based resin is preferably less than 100 ppm, more preferably less than 80 ppm, much more preferably less than 50 ppm and particularly preferably less than 10 ppm. From this point of view, AS resin and ABS resin produced by bulk polymerization are preferably used. As for high heat stability and hydrolysis resistance, when an emulsifier is used in AS resin and ABS resin, the emulsifier is preferably a sulfonic acid salt, more preferably an alkylsulfonic acid salt. When a coagulant is used, the coagulant is preferably sulfuric acid or an alkali earth metal salt of sulfuric acid.

The content of the styrene resin is 3 to 45 parts by weight, preferably 4 to 42.5 parts by weight and more preferably 5 to 40 parts by weight based on 100 parts by weight of the total of the components (A) and (B). When the content is lower than 3 parts by weight, satisfactory flowability is not obtained and when the content is higher than 45 parts by weight, flame retardancy cannot be retained. When an organic phosphorus-based flame retardant is used as the component (C), the styrene resin as the component (F) is preferably used.

(Other Additives)
(i) Phosphorus-Based Stabilizer

The phosphorus-based stabilizer is selected from phosphorous acid, phosphoric acid, phosphorous acid, phosphonic acid and esters thereof, and a tertiary phosphine.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenylphosphite, monobutyldiphenylphosphite, monodecyldiphenyl phosphite, monooctyldiphenyl phosphite, tris(diethylphenyl)phosphite, monobutyldiphenyl phosphite, monodecyldiphenyl phosphite, monooctyldiphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenyl-ethyl)phenyl}pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a dihydric phenol and have a cyclic structure may also be used. The phosphite compounds include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite and 2,2'-methylenebis(4,6-di-tert-butylphenyl)octyl phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with the above phosphite compound having an aryl group substituted by two or more alkyl groups.

Examples of the phosphonate compound include dimethylbenzene phosphonate, diethylbenzene phosphonate and dipropylbenzene phosphonate.

Examples of the tertiary phosphine include triethyl phosphine, tripropyl phosphine, tributyl phosphine, trioctyl phosphine, triamyl phosphine, dimethylphenyl phosphine, dibutylphenyl phosphine, diphenylmethyl phosphine, diphenyloctyl phosphine, triphenyl phosphine, tri-p-tolyl phosphine, trinaphthyl phosphine and diphenylbenzyl phosphine. Triphenyl phosphine is particularly preferred as the tertiary phosphine.

The above phosphorus-based stabilizers may be used alone or in combination of two or more. Out of these phosphorus-based stabilizers, phosphonite compounds and phosphite compounds represented by the following formula (5) are preferred.

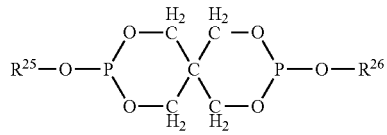

(5)

In the above formula (5), $R^{25}$ and $R^{26}$ are each an alkyl group having 6 to 30 carbon atoms or aryl group having 6 to 30 carbon atoms and may be the same or different.

As described above, tetrakis(2,4-di-tert-butylphenyl)-biphenylene diphosphonites are preferred as the phosphonite compound. Stabilizers comprising this phosphonite as the main component are marketed under the trade names of Sandostab P-EPQ (trademark, manufactured by Clariant) and Irgafos P-EPQ (trademark, manufactured by CIBA SPECIALTY CHEMICALS) and may all be used.

More preferred phosphite compounds of the above formula (5) are distearyl pentaerythritol diphosphite, bis(2,4-di-tert-butylphenyl)pentaerythritol diphosphite, bis(2,6-di-tert-butyl-4-methylphenyl)pentaerythritol diphosphite and bis{2,4-bis(1-methyl-1-phenylethyl)phenyl}pentaerythritol diphosphite.

Distearylpentaerythritol diphosphite is marketed under the trade names of ADK STAB PEP-8 (trademark, manufactured by ADEKA Corporation) and JPP681S (trademark, manufactured by Johoku Chemical Engineering Co., Ltd.) and may be used. Bis(2,4-di-tert-butylphenyl)pentaerythritol diphosphite is marketed under the trade names of ADK STAB PEP-24G (trademark, manufactured by ADEKA Corporation), Alkanox P-24 (trademark, manufactured by Great Lakes Chemical Corporation), Ultranox P626 (trademark, manufactured by GE Specialty Chemicals), Doverphos S-9432 (trademark, manufactured by Dover Chemical Corporation) and Irgafos 126 and 126FF (trademarks, manufactured by CIBA SPECIALTY CHEMICALS) and may be used. Bis(2,6-di-tert-butyl-4-methylphenyl)pentaerythritol diphosphite is marketed under the trade name of ADK STAB PEP-36 (trademark, manufactured by ADEKA Corporation) and may be easily used. Bis{2,4-bis(1-methyl-1-phenylethyl)phenyl}pentaerythritol diphosphite is marketed under the trade names of ADK STAB PEP-45 (trademark, manufactured by ADEKA Corporation) and Doverphos S-9228 (trademark, manufactured by Dover Chemical Corporation) and may be used.

The content of the phosphorus-based stabilizer is preferably 0.001 to 3 parts by weight, more preferably 0.005 to 2 parts by weight and much more preferably 0.01 to 1 part by weight based on 100 parts by weight of the total of the components (A) and (B).

(ii) Hindered Phenol Antioxidant

Various compounds which are generally mixed with a resin may be used as the hindered phenol compound. Examples of the hindered phenol compound include α-tocopherol, butylhydroxytoluene, sinapyl alcohol, vitamin E, octadecyl-3-(3,5-di-tert-butyl-4-hydroxyphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzyl-phosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl) propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl) propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3,5-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl) isocyanurate, 1,3,5-tris-2[3(3,5-di-tert-butyl-4-hydroxyphenyl)propionyl oxy]ethyl isocyanurate, tetrakis[methylene-3-(3,5-di-tert-butyl-4-hydroxyphenyl) propionate]methane, triethylene glycol-N-bis-3-(3-tert-butyl-4-hydroxy-5-methylphenyl) propionate, triethylene glycol-N-bis-3-(3-tert-butyl-4-hydroxy-5-methylphenyl)acetate, 3,9-bis[2-[3-(3-tert-butyl-4-hydroxy-5-methylphenyl) acetyloxy]-1,1-dimethylethyl]-2,4,8,10-tetraoxaspiro[5,5] undecane, tetrakis[methylene-3-(3-tert-butyl-4-hydroxy-5-methylphenyl)propionate]methane, 1,3,5-trimethyl-2,4,6-tris(3-tert-butyl-4-hydroxy-5-methylbenzyl)benzene and tris (3-tert-butyl-4-hydroxy-5-methylebnzyl)isocyanurate.

Out of the above compounds, tetrakis[methylene-3-(3-tert-butyl-4-hydroxy-5-methylphenyl)propionate]methane, octadecyl-3-(3,5-di-tert-butyl-4-hydroxyphenyl)propionate and 3,9-bis{2-[3-(3-tert-butyl-4-hydroxy-5-methylphenyl) propionyloxy]-1,1-dimethylethyl}-2,4,8,10-tetraoxaspiro[5, 5]undecane are preferably used in the present invention. 3,9-bis[2-{3-(3-tert-butyl-4-hydroxy-5-methylphenyl)propionyloxy}-1,1-dimethylethyl]-2,4,8,10-tetraoxaspiro[5,5] undecane is particularly preferred. The above hindered phenol antioxidants may be used alone or in combination of two or more.

Any one of the phosphorus-based stabilizer and the hindered phenol antioxidant is preferably mixed with the resin composition of the present invention, and a combination of these is more preferably used. The content of the hindered phenol antioxidant is preferably 0.001 to 3 part by weight, more preferably 0.005 to 2 parts by weight and much more preferably 0.01 to 1 part by weight based on 100 parts by weight of the total of the components (A) and (B). When a combination of these components is used, it is preferred to use 0.01 to 0.3 part by weight of the phosphorus-based stabilizer and 0.01 to 0.3 part by weight of the hindered phenol antioxidant based on 100 parts by weight of the total of the components (A) and (B).

(iii) Release Agent

Preferably, the polycarbonate resin composition of the present invention further comprises a release agent in order to improve productivity at the time of molding and reduce the distortion of a molded article. Known release agents may be used. Examples of the release agent include saturated fatty acid esters, unsaturated fatty acid esters and polyolefin-based waxes (such as polyethylene wax, 1-alkene polymers. Waxes modified by an acid such as a functional group-containing compound may also be used), silicone compounds, fluorine compounds (such as fluorine oil typified by polyfluoroalkyl ethers), paraffin wax and beeswax. Out of these, fatty acid esters are preferred as the release agent. The fatty acid esters are esters of an aliphatic alcohol and an aliphatic carboxylic acid. The aliphatic alcohol may be either a monohydric alcohol or a polyhydric alcohol having 2 or more hydroxyl groups. The number of carbon atoms of the alcohol is 3 to 32, preferably 5 to 30. Examples of the monohydric alcohol include dodecanol, tetradecanol, hexadecanol, octadecanol, eicosanol, tetracosanol, ceryl alcohol and triacontanol. Examples of the polyhydric alcohol include pentaerythritol, dipentaerythritol, tripentaerythritol, polyglycerol(triglycerol-hexaglycerol), ditrimethylolpropane, xylitol, sorbitol and mannitol. In the fatty acid ester of the present invention, a polyhydric alcohol is more preferred.

The aliphatic carboxylic acid has preferably 3 to 32 carbon atoms, particularly preferably 10 to 22 carbon atoms. Examples of the aliphatic carboxylic acid include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, behenic acid, icosanoic acid and docosanoic acid; and unsaturated aliphatic carboxylic acids such as palmitoleic acid, oleic acid, linoleic acid, linolenic acid, eicosenoic acid, eicosapentaenoic acid and cetoleic acid. Out of these, aliphatic carboxylic acids having 14 to 20 carbon atoms are preferred. Saturated aliphatic carboxylic acids are more preferred. Stearic acid and palmitic acid are particularly preferred.

Since the above aliphatic carboxylic acids such as stearic acid and palmitic acid are generally produced from natural oils and fats such as animal oils and fats typified by beef tallow and lard and vegetable oils and fats typified by palm oil and sunflower oil, they are mixtures containing another carboxylic acid component having a different number of carbon atoms. Therefore, aliphatic carboxylic acids in the form of a mixture containing another carboxylic acid component, produced from a natural oil or fat, especially stearic acid and palmitic acid, are also preferably used in the production of the fatty acid ester of the present invention.

The fatty acid ester of the present invention may be either a partial ester or a full ester. Since the partial ester generally has a large hydroxyl value and easily triggers the decomposition of a resin at a high temperature, the full ester is preferred. The acid value of the fatty acid ester of the present invention is preferably not more than 20, more preferably 4 to 20 and much more preferably 4 to 12 from the viewpoint of heat stability. The acid value can be substantially 0. The hydroxyl value of the fatty acid ester is preferably 0.1 to 30. Further, the iodine value is preferably not more than 10. The iodine value can be substantially 0. These properties can be obtained by methods specified in JIS K0070.

The content of the release agent is preferably 0.005 to 2 parts by weight, more preferably 0.01 to 1 part by weight and much more preferably 0.05 to 0.5 part by weight based on 100 parts by weight of the total of the components (A) and (B). Within the above range, the polycarbonate resin composition has excellent mold releasability and roll releasability. This amount of the fatty acid ester provides a polycarbonate resin composition having excellent mold releasability and roll releasability without impairing good hue.

(iv) Ultraviolet Absorbent

The polycarbonate resin composition of the present invention may comprise an ultraviolet absorbent. Since the resin composition of the present invention is excellent in transparency, it is extremely advantageously used in application fields in which light is let pass therethrough.

Examples of a benzophenone ultraviolet absorbent include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrideratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Examples of a benzotriazole ultraviolet absorbent include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl] benzotriazole, and polymers having a 2-hydroxyphenyl-2H-benzotriazole skeleton such as a copolymer of 2-(2'-hydroxy-5-methacryloxyethylphenyl)-2H-benzotriazole and a vinyl-based monomer copolymerizable with that monomer and a copolymer of 2-(2'-hydroxy-5-acryloxyethylphenyl)-2H-benzotriazole and a vinyl-based monomer copolymerizable with that monomer.

Examples of a hydroxyphenyltriazine ultraviolet absorbent include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Further, compounds having a 2,4-dimethylphenyl group in place of the phenyl groups of the above compounds, such as 2-(4,6-bis(2,4-dimethylphenyl)-1,3,5-triazin-2-yl)-5-hexyloxyphenol, are also included.

Examples of a cyclic iminoester ultraviolet absorbent include 2,2'-p-phenylenebis(3,1-benzoxazin-4-one), 2,2'-(4,4'-diphenylene)bis(3,1-benzoxazin-4-one) and 2,2'-(2,6-naphthalene)bis(3,1-benzoxazin-4-one).

Examples of a cyanoacrylate ultraviolet absorbent include 1,3-bis[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The ultraviolet absorbent may be a polymer type ultraviolet absorbent obtained by copolymerizing an ultraviolet absorbing monomer and/or an optically stable monomer having a hindered amine structure all of which have the structure of a radically polymerizable monomer compound with a monomer such as an alkyl (meth)acrylate. The above ultraviolet absorbing monomer is preferably a compound having a benzotriazole skeleton, a benzophenone skeleton, a triazine skeleton, a cyclic iminoester skeleton or a cyanoacrylate skeleton in the ester substituent of a (meth)acrylic acid ester.

Out of these, benzotriazole-based and hydroxyphenyltriazine-based compounds are preferred from the viewpoint of ultraviolet absorbing ability, and cyclic imionoester-based and cyanoacrylate-based compounds are preferred from the viewpoints of heat resistance and hue (transparency). The above ultraviolet absorbents may be used alone or in combination of two or more.

The content of the ultraviolet absorbent is preferably 0.01 to 2 parts by weight, more preferably 0.02 to 2 parts by weight, much more preferably 0.03 to 1 part by weight and particularly preferably 0.05 to 0.5 part by weight based on 100 parts by weight of the total of the components (A) and (B).

(v) Dye or Pigment

The polycarbonate resin composition of the present invention can provide molded articles having various designs when it further comprises various dyes or pigments. Since the polycarbonate resin composition of the present invention has excellent transparency, it is extremely advantageously used in fields in which light is let pass therethrough. Therefore, by blending a fluorescent brightener, highlight permeability and natural transparency can be provided to the polycarbonate resin composition of the present invention, and by blending a fluorescent brightener or a luminescent fluorescent dye other than the fluorescent brightener, a good design effect making use of emission color can be provided to the polycarbonate resin composition of the present invention. A polycarbonate resin composition which is subtly colored with a trace amount of a dye or a pigment and has high transparency can be provided as well.

Examples of the fluorescent dye (including the fluorescent brightener) used in the present invention include coumalin-based fluorescent dyes, benzopyran-based fluorescent dyes, perylene-based fluorescent dyes, anthraquinone-based fluorescent dyes, thioindigo-based fluorescent dyes, xanthene-based fluorescent dyes, xanthone-based fluorescent dyes, thioxanthene-based fluorescent dyes, thioxanthone-based fluorescent dyes, thiazine-based fluorescent dyes and diaminostilbene-based fluorescent dyes. Out of these, coumalin-based fluorescent dyes, benzopyran-based fluorescent dyes and perylene-based fluorescent dyes are preferred because they have high heat resistance and rarely deteriorate at the time of molding the polycarbonate resin.

Dyes other than the above bluing agents and fluorescent dyes include perylene-based dyes, coumalin-based dyes, thioindigo-based dyes, anthraquinone-based dyes, thioxanthone-based dyes, ferrocyanides such as iron blue, perinone-based dyes, quinoline-based dyes, quinacridone-based dyes, dioxazine-based dyes, isoindolinone-based dyes and phthalocyanine-based dyes. The resin composition of the present invention can obtain a good metallic color when it is blended with a metallic pigment. The metallic pigment is preferably a lamellar filler having a metal film or a metal oxide film.

The content of the above dye or pigment is preferably 0.00001 to 1 part by weight and more preferably 0.00005 to 0.5 part by weight based on 100 parts by weight of the total of the components (A) and (B).

(vi) Other Heat Stabilizers

The polycarbonate resin composition of the present invention may comprise another heat stabilizer except for the above phosphorus-based stabilizer and the above hindered phenol-based antioxidant. The other heat stabilizer is preferably used in combination with any one of the above stabilizer and the antioxidant, particularly preferably both of them. A preferred example of the heat stabilizer is a lactone-based stabilizer typified by a reaction product of 3-hydroxy-5,7-di-tert-butyl-furan-2-one and o-xylene (this stabilizer is detailed in JP-A 7-233160). This compound is marketed under the trade name of Irganox HP-136 (trademark, manufactured by Ciba Specialty Chemicals) and may be used. A stabilizer prepared by mixing together the above compound, a phosphite compound and a hindered phenol compound is commercially available. A preferred example of this stabilizer is the Irganox HP-2921 of Ciba Specialty Chemicals. Such a pre-mixed stabilizer may also be used in the present invention. The content of the lactone-based stabilizer is preferably 0.0005 to 0.05 part by weight and more preferably 0.001 to 0.03 part by weight based on 100 parts by weight of the total of the components (A) and (B).

Other stabilizers include sulfur-containing stabilizers such as pentaerythritol tetrakis(3-mercaptopropionate), pentaerythritol tetrakis(3-laurylthiopropionate) and glycerol-3-stearyl thiopropionate. These stabilizers are effective especially when the resin composition is used for rotational molding. The content of the sulfur-containing stabilizer is preferably 0.001 to 0.1 part by weight and more preferably 0.01 to 0.08 part by weight based on 100 parts by weight of the total of the components (A) and (B).

(vii) Other Fillers

The aromatic polycarbonate resin composition of the present invention may comprise various fillers such as reinforcing fillers as long as the effect of the present invention is obtained. Examples thereof include calcium carbonate, glass fibers, glass beads, glass balloons, glass milled fibers, glass flakes, carbon fibers, carbon flakes, carbon beads, carbon milled fibers, graphite, vapor-phase grown fine carbon fibers (fiber diameter of less than 0.1 µm), carbon nanotubes (fiber diameter of less than 0.1 hollow), fullerene, metal flakes, metal fibers, metal coated glass fibers, metal coated carbon fibers, metal coated glass flakes, silica, metal oxide particles, metal oxide fibers, metal oxide balloons and whiskers (such as potassium titanate whiskers, aluminum borate whiskers and basic magnesium sulfate). These reinforcing fillers may be used alone or in combination of two or more.

The content of the filler is preferably 0.1 to 30 parts by weight and more preferably 0.5 to 25 parts by weight based on 100 parts by weight of the total of the components (A) and (B).

(viii) Highly Light Reflecting White Pigment

A highly light reflecting white pigment may be mixed with the polycarbonate resin composition of the present invention to provide a light reflecting effect. The white pigment is titanium dioxide, particularly preferably titanium dioxide treated with an organic surface treating agent such as silicone. The content of the highly light reflecting white pigment is preferably 3 to 30 parts by weight and more preferably 8 to 25 parts by weight based on 100 parts by weight of the total of the components (A) and (B).

The highly light reflecting white pigments may be used in combination of two or more.

(ix) Other Resins and Elastomer

Another resin and an elastomer may be used in small proportions in the resin composition of the present invention as long as the effect of the present invention is obtained.

Examples of the other resin include polyester resins such as polyethylene terephthalate and polybutylene terephthalate, polyamide resins, polyimide resins, polyether imide resins, polyurethane resins, silicone resins, polyphenylene ether resins, polyphenylene sulfide resins, polysulfone resins, polyolefin resins such as polyethylene and polypropylene, polymethacrylate resins, phenolic resins and epoxy resins.

Examples of the elastomer include isobutylene/isoprene rubber, ethylene/propylene rubber, acrylic elastomers, polyester-based elastomers and polyamide-based elastomers.

(x) Other Additives additives known per se may be mixed with the flame retardant aromatic polycarbonate resin composition of the present invention in small proportions to provide various functions to a molded product of the resin composition and improve the characteristics properties of the molded product. These additives are used in normal amounts as long as the object of the present invention is not impaired.

The additives include a sliding agent such as PTFE particles; a colorant such as carbon black, a pigment or dye such as titanium oxide; a light duffusing agent such as acrylic crosslinked particles, silicon crosslinked particles, thin glass flakes or calcium carbonate particles; a fluorescent dye and an inorganic phosphor such as a phosphor containing an aluminate as a mother crystal; an antistatic agent; a crystal nucleating agent; inorganic and organic antibacterial agents; an optical catalyst-based antifouling agent such as particulate titanium oxide or particulate zinc oxide; a radical generator; an infrared absorbent (heat-ray absorbent); and a photochromic agent.

(Production of Thermoplastic Resin Composition)

Any process is employed to produce the thermoplastic resin composition of the present invention. For example, after the components (A) to (E), according to the circumstances, the component (F), and optionally other additives are fully mixed together by using premixing means such as a twin-cylinder mixer, Henschel mixer, mechanochemical device or extrusion mixer, the resulting premixture is granulated by means of an extrusion granulator or a briquetting machine when necessary, melt kneaded by means of a melt kneader typified by a vented double-screw extruder and pelletized by means of a pelletizer.

Alternatively, a process in which the above components are supplied into a melt kneader typified by a vented double-screw extruder independently or a process in which some of the components are premixed together and supplied into a melt kneader together with the other components or independently is employed. As the process in which some of the components are premixed together, for example, after components except for the component (A) are premixed together and the resulting premixture is mixed with the thermoplastic resin as the component (A) or directly supplied into the extruder.

As the premixing method, for example, when the component (A) is powdery, a method in which some of the powders are blended with additives to produce a master batch of the additives diluted with the powders and the master batch is used may be employed. Further, a method in which one component is supplied at a halfway position of a melt extruder independently may also be employed. When there is a liquid component to be blended, a liquid injection device or a liquid adder may be used to supply it into the melt extruder.

Further, an extruder having a vent from which water contained in the raw materials and a volatile gas generated from the molten kneaded resin can be removed may be preferably used. A vacuum pump is preferably installed to discharge the generated water or volatile gas to the outside of the extruder from the vent efficiently. A screen for removing foreign matter contained in the extruded raw material may be installed in a zone before the dice of the extruder to remove the foreign matter from the resin composition. Examples of the screen include a metal net, a screen changer and a sintered metal plate (such as a disk filter).

Examples of the melt kneader include a Banbury mixer, a kneading roll, a single-screw extruder and a multi-screw extruder having 3 or more screws besides a double-screw extruder.

The resin extruded as described above is pelletized by directly cutting it or by cutting with a pelletizer after a strand is formed from the resin. When the influence of extraneous dust must be reduced at the time of pelletizing, the atmosphere surrounding the extruder is preferably made clean. In the manufacture of the above pellets, it is possible to narrow the form distribution of pellets, reduce the number of miscut products, reduce the amount of fine powders generated at the time of conveyance or transportation and cut the number of cells (vacuum cells) formed in the strand or pellet by using various methods already proposed for polycarbonate resins for use in optical disks. Thereby, it is possible to increase the molding cycle and reduce the incidence of a defect such as a silver streak. The shape of the pellet may be columnar, rectangular column-like, spherical or other ordinary shape, preferably columnar. The diameter of the column is preferably 1 to 5 mm, more preferably 1.5 to 4 mm and much more preferably 2 to 3.3 mm. The length of the column is preferably 1 to 30 mm, more preferably 2 to 5 mm and much more preferably 2.5 to 3.5 mm.

Alternatively, a method in which the components (A) and (E) are melt kneaded together by means of a melt kneader so that the high-concentration component (E) of the present invention is contained so as to produce a master pellet and the master pellet is mixed with the rest of the component (A) and other additives to be pelletized by the melt kneader may be employed.

<Molded Article of Resin Composition of the Present Invention>

Various products can be generally manufactured from the resin composition of the present invention by injection molding the pellets obtained by the above methods. Molded articles can be obtained not only by ordinary molding techniques but also by injection molding techniques such as injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding according to purpose. The advantages of these molding techniques are already widely known. Both cold-runner molding and hot-runner molding techniques may also be employed.

The resin composition of the present invention may be formed into an odd-shaped extrusion molded article, a sheet or a film by extrusion molding. Inflation, calendering and casting techniques may also be used to mold a sheet or a film. Further, specific stretching operation may be used to mold it into a heat shrinkable tube. The resin composition of the present invention can be formed into a molded article by rotational molding or blow molding as well.

Molded articles of the resin composition of the present invention are advantageously used in interior parts and housings for OA equipment and home electric appliances. These products include personal computers, notebook personal computers, CRT displays, printers, portable terminals, cell phones, copiers, facsimiles, recording media (such as CD, CD-ROM, DVD, PD and FDD) drives, parabolic antennas, electric tools, VTR, TV, irons, hair driers, rice cookers, microwave ovens, acoustic equipment, audio/laser disk and compact disk audio equipment, lighting equipment, refrigerators, air conditioners, typewriters and word processors. A resin product formed from the flame retardant thermoplastic resin composition of the present invention may be used in parts such as the housings of these products. Other resin products include auto parts such as deflector parts, car navigation parts and car stereo parts.

The mode of the invention that the inventors of the present invention think is the best is a combination of the preferred ranges of the above requirements. For example, typical examples thereof are described in the following examples. It is to be understood that the present invention is not limited thereto.

EXAMPLES

The following examples are provided to further illustrate the present invention. "Parts" in the examples means "parts by weight" and "%" means "wt %" unless otherwise noted. Evaluations were made by the following methods.
(Evaluation of Thermopasltic Resin Composition)
(i) Content of Polydiorganosiloxane (PDMS) in Composition The content of PDMS in the composition was calculated from the content of PDMS in the polycarbonate-polydiorganosiloxane copolymer resin (PC-PDMS copolymer resin) added.

(content of PDMS in composition, wt %)={(weight of PDMS in PC-PDMS copolymer resin)×100}/ (weight of whole composition)

(ii) Flame Retardancy

A 5V combustion test was made on specimens having thicknesses of 0.8 mm, 1.0 mm, 1.2 mm and 1.5 mm in accordance with UL94 standards. The flame retardant rating is preferably 5 VB.
(iii) Charpy Impact Strength Notched Charpy impact strength was measured in accordance with ISO 179.
(iv) Heat Resistance The deflection temperature under load was measured in accordance with ISO 75-1 and 75-2. The measurement load was 1.80 MPa.
(v) Flowability The length of an Archimedes spiral flow having a flow 3.0 thickness of 2 mm and a flow width of 8 mm was measured by using an injection molding machine [SG150U of Sumitomo Heavy Industries, Ltd.]. Measurement was made at a cylinder temperature of 260° C., a mold temperature of 70° C. and an injection pressure of 98 MPa.

Examples 1 to 15 and Comparative Examples 1 to 14

A mixture of components excluding FR-1 as the component (C) in a ratio shown in Table 1 or Table 2 was supplied from the first feed port of an extruder. The mixture was obtained by mixing the following premixture (i) with other components by means of a twin-cylinder mixer. That is, the premixture (i) was a mixture of the component (E) (dripping inhibitor) and an aromatic polycarbonate as the component (A) and prepared by mixing them together uniformly by shaking them in a polyethylene bag so that the content of the component (E) became 2.5 wt %. To further add FR-1 as the component (C), it was supplied into the extruder in a predetermined ratio from the third feed port (between the first feed port and a vent exhaust port) at a halfway position of the cylinder using a liquid injection device (HYM-JS-08 of Fuji Techno Kogyo Co., Ltd.) while it was heated at 80° C. The liquid injection device was designed to supply a predetermined amount, and the feed rates of other raw materials were measured accurately by means of a meter [CWF of Kubota Corporation]. The resulting mixture was extruded by means of a vented double-screw extruder having a diameter of 30 mm (TEX30α-38 5BW-3V of The Japan Steel Works, Ltd.) and melt kneaded at a screw revolution of 150 rpm, a delivery rate of 20 kg/h and a vent vacuum degree of 3 kPa to obtain pellets. The extrusion temperature was set at 260° C. from the first feed port to the dice.

Some of the obtained pellets were dried at 80 to 90° C. for 6 hours in a hot air circulation drier and molded into test specimens for evaluation (based on UL94, ISO179, ISO75-1 and ISO75-2) by using an injection molding machine. The results are shown in Table 1 and Table 2.

Components represented by symbols in Tables 1 to 4 are as follows.
(Component A)
PC: aromatic polycarbonate resin [polycarbonate resin powder having a viscosity average molecular weight of 19,800 produced from bisphenol A and phosgene in accordance with a commonly used method, Panlite L-1225WX of Teijin Chemicals Ltd.]
(Component B)
PC-PDMS-1: polycarbonate-polydiorganosiloxane copolymer resin (viscosity average molecular weight of 19,800, PDMS content of 4.2 wt %, PDMS polymerization degree of 37)
PC-PDMS-2: polycarbonate-polydiorganosiloxane copolymer resin (viscosity average molecular weight of 19,800, PDMS content of 8.4 wt %, PDMS polymerization degree of 37)
PC-PDMS-3: polycarbonate-polydiorganosiloxane copolymer resin (viscosity average molecular weight of 19,800, PDMS content of 4.2 wt %, PDMS polymerization degree of 8)
PC-PDMS-4: polycarbonate-polydiorganosiloxane copolymer resin (viscosity average molecular weight of 19,800, PDMS content of 4.2 wt %, PDMS polymerization degree of 150)
(Component C)
FR-1: phosphoric acid ester containing bisphenol A bis (diphenylphosphate) as the main component (CR-741 (trade name) of Daihachi Chemical Industry Co., Ltd.)
FR-2: perfluorobutanesulfonic acid potassium salt (Megafac F-114P (trade name) of DIC Corporation)
FR-3: organic siloxane-based flame retardant having a Si—H group, a methyl group and a phenyl group (X-40-2600) (trade name) of Shin-Etsu Chemical Co., Ltd.)
(Component D)
Talc-1: talc (HST0.8 (trade name) of Hayashi-Kasei Co., Ltd., average particle diameter of 3.5 μm)
Talc-2: talc (HTP ultra 5c (trade name) of IMI Fabi S.p.A., average particle diameter of 0.5 μm)
Talc-3: talc (Victory Light SG-A (trade name) of Shokozan Mining Co., Ltd., average particle diameter of 15.2 μm)
WSN: wollastonite (NYGLOS4 of NYCO Products Company)
MICA: mica (Mica Powder MT-200B of Kinsei Matec Co., Ltd.)

(Component E)
PTFE-1: polytetrafluoroethylene (Polyflon MP FA500B (trade name) of Daikin Industries, Ltd.)
PTFE-2: SN3300B7 (trade name) of Shine Polymer Co., Ltd., this polytetrafluoroethylene-based mixture is a mixture of branched polytetrafluoroethylene particles produced by suspension polymerization and styrene-acrylonitrile copolymer particles) (polytetrafluoroethylene content of 50 wt %)
(Component F)
ABS-1: ABS resin [Kralastic SXH-330 (trade name) of Nippon A&L Inc., butadiene rubber component content of about 17.5 wt %, weight average rubber particle diameter of 0.40 produced by emulsion polymerization, containing no lubricant (EBS)]
ABS-2: ABS resin [Kralastic GA-704 (trade name) of Nippon A&L Inc., butadiene rubber component content of about 17.5 wt %, weight average rubber particle diameter of 0.40 produced by emulsion polymerization, containing a lubricant (EBS)]
MBS: core-shell type graft copolymer [ParaloidEXL-2678 (trade name) of Rohm and Haas Company, graft copolymer having a core comprising 60 wt % of polybutadiene and a shell comprising 40 wt % of styrene and methyl methacrylate, weight average particle diameter of 0.35 produced by emulsion polymerization]
(Other Components)
DC30M: olefin-based wax obtained by copolymerization of α-olefin and maleic anhydride (DIACARNA 30M (trade name) of Mitsubishi Chemical Corporation)
SL900: fatty acid ester-based release agent (Rikemal SL900 (trade name) of Riken Vitamin Co., Ltd.)
IRGX: phenol-based heat stabilizer (IRGANOX1076 (trade name) of Ciba Specialty Chemicals K.K.)

TABLE 1

| | | Items | Unit | Examples 1 | 2 | 3 | 4 | 5 | 6 | 7 | 8 |
|---|---|---|---|---|---|---|---|---|---|---|---|
| Composition | A | PC | pbw | 89 | 89 | 93 | 89 | 94.5 | 84 | 89 | 89 |
| | B | PC-PDMS-1 | pbw | 11 | 11 | 7 | 11 | | 16 | 11 | 11 |
| | | PC-PDMS-2 | pbw | | | | | 5.5 | | | |
| | | Total | pbw | 100 | 100 | 100 | 100 | 100 | 100 | 100 | 100 |
| | C | FR-1 | pbw | | 4 | 10 | 10 | 10 | 10 | 23 | |
| | | FR-2 | pbw | 0.05 | | | | | | | 4.5 |
| | D | Talc-1 | pbw | 3 | 3 | 3 | 3 | 3 | 3 | 3 | 3 |
| | | Talc-2 | pbw | | | | | | | | |
| | | Talc-3 | pbw | | | | | | | | |
| | | WSN | pbw | | | | | | | | |
| | | MICA | pbw | | | | | | | | |
| | E | PTFE-1 | pbw | 0.4 | 0.4 | 0.4 | 0.4 | 0.4 | 0.4 | 0.4 | 0.4 |
| | | PTFE-2 | pbw | | | | | | | | |
| | Others | DC30M | pbw | 0.3 | 0.3 | 0.3 | 0.3 | 0.3 | 0.3 | 0.3 | 0.3 |
| | | SL900 | pbw | 0.3 | 0.3 | 0.3 | 0.3 | 0.3 | 0.3 | 0.3 | 0.3 |
| | | IRGX | pbw | 0.15 | 0.15 | 0.15 | 0.15 | 0.15 | 0.15 | 0.15 | 0.15 |
| Evaluation results | | Content of PDMS in composition | wt % | 0.44 | 0.43 | 0.26 | 0.40 | 0.40 | 0.59 | 0.36 | 0.43 |
| | | Flame retardancy (1.0 mm/5VB) | — | ○ | ○ | ○ | ○ | ○ | ○ | ○ | ○ |
| | | Flame retardancy (1.2 mm/5VB) | — | ○ | ○ | ○ | ○ | ○ | ○ | ○ | ○ |
| | | Flame retardancy (1.5 mm/5VB) | — | ○ | ○ | ○ | ○ | ○ | ○ | ○ | ○ |
| | | Charpy impact strength | kJ/m² | 16 | 14 | 11 | 13 | 13 | 15 | 9 | 13 |
| | | Deflection temperature under load | °C. | 122 | 112 | 104 | 104 | 104 | 103 | 76 | 120 |
| | | Spiral flow length | cm | 23 | 26 | 33 | 33 | 33 | 33 | 40 | 23 |

| | | Items | Unit | Examples 9 | 10 | 11 | 12 | 13 | 14 | 15 |
|---|---|---|---|---|---|---|---|---|---|---|
| Composition | A | PC | pbw | 89 | 89 | 89 | 89 | 89 | 89 | 89 |
| | B | PC-PDMS-1 | pbw | 11 | 11 | 11 | 11 | 11 | 11 | 11 |
| | | PC-PDMS-2 | pbw | | | | | | | |
| | | Total | pbw | 100 | 100 | 100 | 100 | 100 | 100 | 100 |
| | C | FR-1 | pbw | 10 | 10 | 10 | 10 | 10 | 10 | 10 |
| | | FR-2 | pbw | | | | | | | |
| | D | Talc-1 | pbw | 1 | 25 | | | | | 3 |
| | | Talc-2 | pbw | | | 3 | | | | |
| | | Talc-3 | pbw | | | | 3 | | | |
| | | WSN | pbw | | | | | 3 | | |
| | | MICA | pbw | | | | | | 3 | |
| | E | PTFE-1 | pbw | 0.4 | 0.4 | 0.4 | 0.4 | 0.4 | 0.4 | |
| | | PTFE-2 | pbw | | | | | | | 0.8 |
| | others | DC30M | pbw | 0.3 | 0.3 | 0.3 | 0.3 | 0.3 | 0.3 | 0.3 |
| | | SL900 | pbw | 0.3 | 0.3 | 0.3 | 0.3 | 0.3 | 0.3 | 0.3 |
| | | IRGX | pbw | 0.15 | 0.15 | 0.15 | 0.15 | 0.15 | 0.15 | 0.15 |

TABLE 1-continued

| Evaluation results | Content of PDMS in composition | wt % | 0.41 | 0.34 | 0.40 | 0.40 | 0.40 | 0.40 | 0.40 |
|---|---|---|---|---|---|---|---|---|---|
| | Flame retardancy (1.0 mm/5VB) | — | X | ○ | ○ | ○ | ○ | ○ | ○ |
| | Flame retardancy (1.2 mm/5VB) | — | ○ | ○ | ○ | ○ | ○ | ○ | ○ |
| | Flame retardancy (1.5 mm/5VB) | — | ○ | ○ | ○ | ○ | ○ | ○ | ○ |
| | Charpy impact strength | kJ/m$^2$ | 27 | 6 | 13 | 9 | 8 | 7 | 12 |
| | Deflection temperature under load | °C. | 104 | 108 | 104 | 104 | 104 | 104 | 104 |
| | Spiral flow length | cm | 34 | 30 | 33 | 33 | 33 | 33 | 33 | pbw: parts by weight

TABLE 2

| | | | Unit | Comparative Examples | | | | | | |
|---|---|---|---|---|---|---|---|---|---|---|
| | Items | | | 1 | 2 | 3 | 4 | 5 | 6 | 7 |
| Composition | A | PC | pbw | 89 | 89 | 89 | 89 | 89 | 89 | 89 |
| | B | PC-PDMS-1 | pbw | 11 | 11 | 11 | 11 | 11 | 11 | 11 |
| | | PC-PDMS-3 | | | | | | | | |
| | | PC-PDMS-4 | | | | | | | | |
| | | Total | pbw | 100 | 100 | 100 | 100 | 100 | 100 | 100 |
| | C | FR-1 | pbw | | | | 2 | 36 | | 10 |
| | | FR-2 | pbw | | 0.003 | 6 | | | | 1.5 |
| | | FR-3 | pbw | | | | | | 1.5 | |
| | D | Talc-1 | pbw | 3 | 3 | 3 | 3 | 3 | 3 | 3 |
| | E | PTFE-1 | pbw | 0.4 | 0.4 | 0.4 | 0.4 | 0.4 | 0.4 | 0.4 |
| | others | DC30M | pbw | 0.3 | 0.3 | 0.3 | 0.3 | 0.3 | 0.3 | 0.3 |
| | | SL900 | pbw | 0.3 | 0.3 | 0.3 | 0.3 | 0.3 | 0.3 | 0.3 |
| | | IRGX | pbw | 0.15 | 0.15 | 0.15 | 0.15 | 0.15 | 0.15 | 0.15 |
| Evaluation results | Content of PDMS in composition | wt % | 0.44 | 0.44 | 0.42 | 0.44 | 0.35 | 0.44 | 0.40 |
| | Flame retardancy (1.0 mm/5VB) | — | X | X | X | X | X | X | X |
| | Flame retardancy (1.2 mm/5VB) | — | X | X | X | X | X | X | X |
| | Flame retardancy (1.5 mm/5VB) | — | X | X | X | X | X | X | X |
| | Charpy impact strength | kJ/m$^2$ | 20 | 19 | 12 | 14 | 7 | 19 | 11 |
| | Deflection temperature under load | °C. | 123 | 123 | 119 | 115 | 72 | 123 | 101 |
| | Spiral flow length | cm | 22 | 22 | 24 | 23 | 43 | 22 | 33 |

| | | | Unit | Comparative Examples | | | | | | |
|---|---|---|---|---|---|---|---|---|---|---|
| | Items | | | 8 | 9 | 10 | 11 | 12 | 13 | 14 |
| Composition | A | PC | pbw | 89 | 89 | 100 | 96 | 78 | 89 | 89 |
| | B | PC-PDMS-1 | pbw | 11 | 11 | 0 | 4 | 22 | | |
| | | PC-PDMS-3 | | | | | | | 11 | |
| | | PC-PDMS-4 | | | | | | | | 11 |
| | | Total | pbw | 100 | 100 | 100 | 100 | 100 | 100 | 100 |
| | C | FR-1 | pbw | 10 | 10 | 10 | 10 | 10 | 10 | 10 |
| | | FR-2 | pbw | | | | | | | |
| | | FR-3 | pbw | | | | | | | |
| | D | Talc-1 | pbw | 0.05 | 35 | 3 | 3 | 3 | 3 | 3 |
| | E | PTFE-1 | pbw | 0.4 | 0.4 | 0.4 | 0.4 | 0.4 | 0.4 | 0.4 |
| | others | DC30M | pbw | 0.3 | 0.3 | 0.3 | 0.3 | 0.3 | 0.3 | 0.3 |
| | | SL900 | pbw | 0.3 | 0.3 | 0.3 | 0.3 | 0.3 | 0.3 | 0.3 |
| | | IRGX | pbw | 0.15 | 0.15 | 0.15 | 0.15 | 0.15 | 0.15 | 0.15 |
| Evaluation results | Content of PDMS in composition | wt % | 0.42 | 0.32 | 0.00 | 0.15 | 0.81 | 0.40 | 0.40 |
| | Flame retardancy (1.0 mm/5VB) | — | X | ○ | X | X | X | X | X |
| | Flame retardancy (1.2 mm/5VB) | — | X | ○ | X | X | X | X | X |

TABLE 2-continued

| | | | | | | | | |
|---|---|---|---|---|---|---|---|---|
| Flame retardancy (1.5 mm/5VB) | — | X | ◯ | X | X | X | X | X |
| Charpy impact strength | kJ/m² | 29 | 3 | 9 | 10 | 18 | 12 | 16 |
| Deflection temperature under load | °C. | 104 | 110 | 105 | 104 | 103 | 103 | 103 |
| Spiral flow length | cm | 34 | 28 | 33 | 33 | 33 | 33 | 33 | pbw: parts by weight

Examples 16 to 31 and Comparative Examples 15 to 29

A mixture of components excluding ABS resin as the component (F) and FR-1 as the component (C) in a ratio shown in Table 3 or Table 4 was supplied from the first feed port of an extruder. The mixture was obtained by mixing the following premixture (i) with other components by means of a twin-cylinder mixer. That is, the premixture (i) was a mixture of the component (E) (dripping inhibitor) and an aromatic polycarbonate as the component (A) and prepared by mixing them together uniformly by shaking them in a polyethylene bag so that the content of the component (E) became 2.5 wt %. To add ABS resin as the component (F), it was supplied from the second feed port by using a side feeder. To further add FR-1 as the component (C), it was supplied into the extruder in a predetermined ratio from the third feed port (between the first feed port and a vent exhaust port) at a halfway position of the cylinder using a liquid injection device (HYM-JS-08 of Fuji Techno Kogyo Co., Ltd.) while it was heated at 80° C. The liquid injection device was designed to supply a predetermined amount, and the feed rates of other raw materials were measured accurately by means of a meter [CWF of Kubota Corporation]. The resulting mixture was extruded by means of a vented double-screw extruder having a diameter of 30 mm (TEX30α-38.5BW-3V of The Japan Steel Works, Ltd.) and melt kneaded at a screw revolution of 150 rpm, a delivery rate of 20 kg/h and a vent vacuum degree of 3 kPa to obtain pellets. The extrusion temperature was set at 260° C. from the first feed port to the dice.

Some of the obtained pellets were dried at 80 to 90° C. for 6 hours in a hot air circulation drier and molded into test specimens for evaluation (based on UL94, ISO179, ISO75-1 and ISO75-2) by using an injection molding machine. The results are shown in Table 3 and Table 4.

TABLE 3

| | | | | Examples | | | | | | | |
|---|---|---|---|---|---|---|---|---|---|---|---|
| | Item | | Unit | 16 | 17 | 18 | 19 | 20 | 21 | 22 | 23 |
| Composition | A | PC | pbw | 87 | 87 | 91 | 87 | 93.5 | 78 | 87 | 87 |
| | B | PC-PDMS-1 | Pbw | 13 | 13 | 9 | 13 | | 22 | 13 | 13 |
| | | PC-PDMS-2 | pbw | | | | | 6.5 | | | |
| | | Total | pbw | 100 | 100 | 100 | 100 | 100 | 100 | 100 | 100 |
| | F | ABS-1 | Pbw | 5 | 3 | 20 | 20 | 20 | 20 | 40 | |
| | | ABS-2 | pbw | | | | | | | | 20 |
| | | MBS | pbw | | 3 | 3 | 3 | 3 | 3 | 3 | 3 |
| | C | FR-1 | pbw | 3 | 25 | 25 | 25 | 25 | 25 | 25 | 25 |
| | D | Talc-1 | Pbw | 8 | 8 | 8 | 8 | 8 | 8 | 8 | 8 |
| | | Talc-2 | pbw | | | | | | | | |
| | | Talc-3 | Pbw | | | | | | | | |
| | | WSN | pbw | | | | | | | | |
| | | MICA | pbw | | | | | | | | |
| | E | PTFE-1 | Pbw | 0.6 | 0.6 | 0.6 | 0.6 | 0.6 | 0.6 | 0.6 | 0.6 |
| | | PTFE-2 | pbw | | | | | | | | |
| | others | DC30M | Pbw | 0.4 | 0.4 | 0.4 | 0.4 | 0.4 | 0.4 | 0.4 | 0.4 |
| | | SL900 | Pbw | 0.4 | 0.4 | 0.4 | 0.4 | 0.4 | 0.4 | 0.4 | 0.4 |
| | | IRGX | Pbw | 0.2 | 0.2 | 0.2 | 0.2 | 0.2 | 0.2 | 0.2 | 0.2 |
| Evaluation results | Content of PDMS in composition | | wt % | 0.46 | 0.39 | 0.24 | 0.35 | 0.35 | 0.59 | 0.31 | 0.35 |
| | Flame retardancy (0.8 mm/5VB) | | — | ◯ | ◯ | ◯ | ◯ | ◯ | ◯ | ◯ | ◯ |
| | Flame retardancy (1.0 mm/5VB) | | — | ◯ | ◯ | ◯ | ◯ | ◯ | ◯ | ◯ | ◯ |
| | Flame retardancy (1.2 mm/5VB) | | — | ◯ | ◯ | ◯ | ◯ | ◯ | ◯ | ◯ | ◯ |
| | Charpy impact strength | | kJ/m² | 28 | 22 | 12 | 15 | 15 | 17 | 11 | 15 |
| | Deflection temperature under load | | °C. | 110 | 84 | 79 | 79 | 79 | 78 | 79 | 79 |
| | Spiral flow length | | cm | 35 | 38 | 52 | 52 | 52 | 52 | 61 | 52 |

TABLE 3-continued

|  |  | Items | Unit | Examples |  |  |  |  |  |  |  |
|---|---|---|---|---|---|---|---|---|---|---|---|
|  |  |  |  | 24 | 25 | 26 | 27 | 28 | 29 | 30 | 31 |
| Composition | A | PC | pbw | 87 | 87 | 87 | 87 | 87 | 87 | 87 | 87 |
|  | B | PC-PDMS-1 | pbw | 13 | 13 | 13 | 13 | 13 | 13 | 13 | 13 |
|  |  | PC-PDMS-2 | pbw |  |  |  |  |  |  |  |  |
|  |  | Total | pbw | 100 | 100 | 100 | 100 | 100 | 100 | 100 | 100 |
|  | F | ABS-1 | pbw | 20 | 20 | 20 | 20 | 20 | 20 | 20 | 20 |
|  |  | ABS-2 | pbw |  |  |  |  |  |  |  |  |
|  |  | MBS | pbw | 3 | 3 | 3 | 3 | 3 | 3 | 3 | 3 |
|  | C | FR-1 | pbw | 33 | 25 | 25 | 25 | 25 | 25 | 25 | 25 |
|  | D | Talc-1 | pbw | 8 | 1 | 25 |  |  |  |  | 8 |
|  |  | Talc-2 | pbw |  |  |  | 8 |  |  |  |  |
|  |  | Talc-3 | pbw |  |  |  |  | 8 |  |  |  |
|  |  | WSN | pbw |  |  |  |  |  | 8 |  |  |
|  |  | MICA | pbw |  |  |  |  |  |  | 8 |  |
|  | E | PTFE-1 | pbw | 0.6 | 0.6 | 0.6 | 0.6 | 0.6 | 0.6 | 0.6 |  |
|  |  | PTFE-2 | pbw |  |  |  |  |  |  |  | 1.2 |
|  | others | DC30M | pbw | 0.4 | 0.4 | 0.4 | 0.4 | 0.4 | 0.4 | 0.4 | 0.4 |
|  |  | SL900 | pbw | 0.4 | 0.4 | 0.4 | 0.4 | 0.4 | 0.4 | 0.4 | 0.4 |
|  |  | IRGX | pbw | 0.2 | 0.2 | 0.2 | 0.2 | 0.2 | 0.2 | 0.2 | 0.2 |
| Evaluation results | | Content of PDMS in composition | wt % | 0.33 | 0.36 | 0.31 | 0.35 | 0.35 | 0.35 | 0.35 | 0.35 |
|  |  | Flame retardancy (0.8 mm/5VB) | — | ○ | ○ | ○ | ○ | ○ | ○ | ○ | ○ |
|  |  | Flame retardancy (1.0 mm/5VB) | — | ○ | ○ | ○ | ○ | ○ | ○ | ○ | ○ |
|  |  | Flame tardancy 1.2 mm/5VB) | — | ○ | ○ | ○ | ○ | ○ | ○ | ○ | ○ |
|  |  | Charpy impact strength | kJ/m$^2$ | 10 | 23 | 6 | 17 | 13 | 11 | 10 | 15 |
|  |  | Deflection temperature under load | °C. | 70 | 78 | 85 | 79 | 79 | 79 | 79 | 79 |
|  |  | Spiral flow length | cm | 59 | 53 | 47 | 52 | 52 | 52 | 52 | 52 | pbw: parts by weight

TABLE 4

|  |  | Items | Unit | Comparative Examples |  |  |  |  |  |  |  |
|---|---|---|---|---|---|---|---|---|---|---|---|
|  |  |  |  | 15 | 16 | 17 | 18 | 19 | 20 | 21 | 22 |
| Composition | A | PC | pbw | 87 | 87 | 87 | 87 | 87 | 87 | 87 | 87 |
|  | B | PC-PDMS-1 | pbw | 13 | 13 | 13 | 13 | 13 | 13 | 13 | 13 |
|  |  | PC-PDMS-3 |  |  |  |  |  |  |  |  |  |
|  |  | PC-PDMS-4 |  |  |  |  |  |  |  |  |  |
|  |  | total | pbw | 100 | 100 | 100 | 100 | 100 | 100 | 100 | 100 |
|  | F | ABS-1 | pbw | 2 | 45 | 20 | 20 | 20 | 20 | 20 | 20 |
|  |  | MBS | pbw |  | 5 | 3 | 3 | 3 | 3 | 3 | 3 |
|  | C | FR-1 | pbw | 25 | 25 | 0 | 2 | 37 |  |  | 25 |
|  |  | FR-2 | pbw |  |  |  |  |  | 1.5 |  |  |
|  |  | FR-3 | pbw |  |  |  |  |  |  | 1.5 | 1.5 |
|  | D | Talc-1 | pbw | 8 | 8 | 8 | 8 | 8 | 8 | 8 | 8 |
|  | E | PTFE-1 | pbw | 0.6 | 0.6 | 0.6 | 0.6 | 0.6 | 0.6 | 0.6 | 0.6 |
|  | others | DC30M | pbw | 0.4 | 0.4 | 0.4 | 0.4 | 0.4 | 0.4 | 0.4 | 0.4 |
|  |  | SL900 | pbw | 0.4 | 0.4 | 0.4 | 0.4 | 0.4 | 0.4 | 0.4 | 0.4 |
|  |  | IRGX | pbw | 0.2 | 0.2 | 0.2 | 0.2 | 0.2 | 0.2 | 0.2 | 0.2 |
| Evaluation results | | Content of PDMS in composition | wt % | 0.40 | 0.30 | 0.41 | 0.41 | 0.32 | 0.41 | 0.41 | 0.34 |
|  |  | Flame retardancy (0.8 mm/5VB) | — | ○ | ○ | X | X | X | X | X | X |
|  |  | Flame retardancy (1.0 mm/5VB) | — | ○ | ○ | X | X | X | X | X | X |
|  |  | Flame retardancy (1.2 mm/5VB) | — | ○ | ○ | X | X | X | X | X | X |

| Items | | | Unit | 23 | 24 | 25 | 26 | 27 | 28 | 29 |
|---|---|---|---|---|---|---|---|---|---|---|
| | | Charpy impact strength | kJ/m² | 28 | 17 | 31 | 29 | 5 | 31 | 31 | 13 |
| | | Deflection temperature under load | °C. | 83 | 79 | 116 | 115 | 62 | 115 | 115 | 78 |
| | | Spiral flow length | cm | 28 | 65 | 37 | 38 | 63 | 38 | 38 | 47 |

Comparative Examples

| | Items | | Unit | 23 | 24 | 25 | 26 | 27 | 28 | 29 |
|---|---|---|---|---|---|---|---|---|---|---|
| Composition | A | PC | pbw | 87 | 87 | 100 | 95 | 77 | 87 | 87 |
| | B | PC-PDMS-1 | pbw | 13 | 13 | 0 | 5 | 23 | | |
| | | PC-PDMS-3 | | | | | | | 13 | |
| | | PC-PDMS-4 | | | | | | | | 13 |
| | | Total | pbw | 100 | 100 | 100 | 100 | 100 | 100 | 100 |
| | F | ABS-1 | pbw | 20 | 20 | 20 | 20 | 20 | 20 | 20 |
| | | MBS | pbw | 3 | 3 | 3 | 3 | 3 | 3 | 3 |
| | C | FR-1 | pbw | 25 | 25 | 25 | 25 | 25 | 25 | 25 |
| | | FR-2 | pbw | | | | | | | |
| | | FR-3 | pbw | | | | | | | |
| | D | Talc-1 | pbw | 0.05 | 35 | 8 | 8 | 8 | 8 | 8 |
| | E | PTFE-1 | pbw | 0.6 | 0.6 | 0.6 | 0.6 | 0.6 | 0.6 | 0.6 |
| | Others | DC30M | pbw | 0.4 | 0.4 | 0.4 | 0.4 | 0.4 | 0.4 | 0.4 |
| | | SL900 | pbw | 0.4 | 0.4 | 0.4 | 0.4 | 0.4 | 0.4 | 0.4 |
| | | IRGX | pbw | 0.2 | 0.2 | 0.2 | 0.2 | 0.2 | 0.2 | 0.2 |
| Evaluation results | Content of PDMS in composition | | wt % | 0.36 | 0.30 | 0.00 | 0.13 | 0.61 | 0.35 | 0.35 |
| | Flame retardancy (0.8 mm/5VB) | | — | X | ○ | X | X | X | X | X |
| | Flame retardancy (1.0 mm/5VB) | | — | X | ○ | X | X | X | X | X |
| | Flame retardancy (1.2 mm/5VB) | | — | X | ○ | X | ○ | X | X | X |
| | Charpy impact strength | | kJ/m² | 24 | 2 | 11 | 13 | 18 | 12 | 17 |
| | Deflection temperature under load | | °C. | 76 | 82 | 80 | 79 | 78 | 79 | 79 |
| | Spiral flow length | | cm | 53 | 45 | 52 | 52 | 51 | 52 | 52 | pbw: parts by weight

It is understood from the above tables that when a specific amount of the polycarbonate-polydiorganosiloxane copolymer resin of the present invention is used, even a thin molded article of the resulting resin composition achieves good balance among flame retardancy, impact resistance and flowability high-dimensionally.

EFFECT OF THE INVENTION

Since a thin molded article of the thermoplastic resin composition of the present invention has excellent flame retardancy and high levels of impact resistance and flowability, it is useful in a wide variety of fields such as OA equipment and others. Therefore, the present invention has a great industrial effect.

The invention claimed is:
1. A flame retardant resin composition comprising:
100 parts by weight of a resin component comprising (A) a polycarbonate-based resin and (B) a polycarbonate-polydiorganosiloxane copolymer resin obtained by copolymerizing a dihydric phenol represented by the following formula (1) with a hydroxyaryl-terminated polydiorganosiloxane represented by the following formula (3),
(C) 3 to 35 parts by weight of an organic phosphorus-based flame retardant or 0.005 to 5 parts by weight of an organic metal salt-based flame retardant,
(D) 0.1 to 30 parts by weight of a silicate mineral, and
(E) 0.1 to 3 parts by weight of a dripping inhibitor,
wherein the polydiorganosiloxane content of the component (B) in the composition is 0.2 to 0.6 wt %,

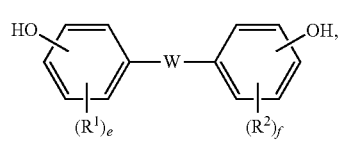

in the above formula (1), $R^1$ and $R^2$ are each independently a group selected from the class consisting of halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group, and may be the same or different when there are a plurality of $R^1$'s and a plurality of $R^2$'s, "e" and "f" are each an integer of 1 to 4, and W is a single bond or at least one group selected from the class consisting of groups represented by the following formulas (2):

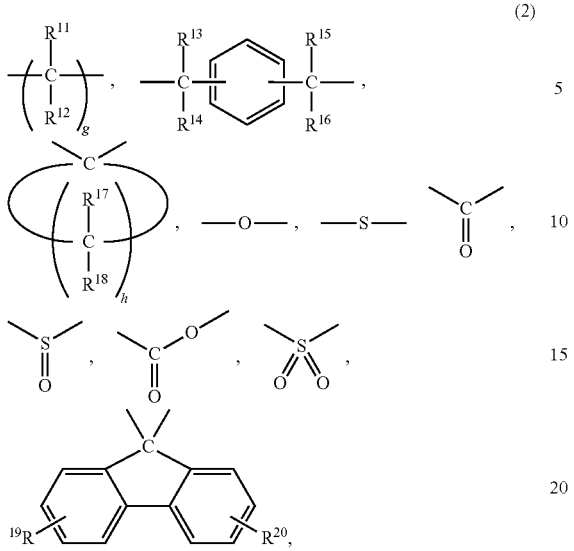

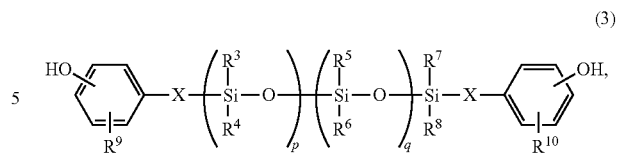

in the above formulas (2), $R^{11}$, $R^{12}$, $R^{13}$, $R^{14}$, $R^{15}$, $R^{16}$, $R^{17}$ and $R^{18}$ are each independently a group selected from the class consisting of hydrogen atom, alkyl group having 1 to 18 carbon atoms, aryl group having 3 to 14 carbon atoms and aralkyl group having 7 to 20 carbon atoms, $R^{19}$ and $R^{20}$ are each independently a group selected from the class consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, and when there are a plurality of $R^{11}$'s, a plurality of $R^{12}$'s, a plurality of $R^{17}$'s and a plurality of $R^{18}$'s, they may be the same or different, "g" is an integer of 1 to 10, and "h" is an integer of 4 to 7, in the above formula (3), $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, $R^9$ and $R^{10}$ are each independently a hydrogen atom, halogen atom, alkyl group having 1 to 10 carbon atoms or alkoxy group having 1 to 10 carbon atoms, "p" is a natural number, "q" is 0 or a natural number, (p+q) is a natural number of less than 300, and two X's are divalent aliphatic groups having 2 to 8 carbon atoms.

2. The flame retardant resin composition according to claim 1, wherein the polyorganosiloxane content of the component B is 0.2 to 0.45 wt %.

3. The flame retardant resin composition according to claim 1 which further comprises (F) 3 to 45 parts by weight of a styrene resin.

4. The flame retardant resin composition according to claim 1, wherein the silicate mineral is talc.

5. The flame retardant resin composition according to claim 1, wherein the dripping inhibitor is coated branched polytetrafluoroethylene.

6. The flame retardant resin composition according to claim 1 which attains UL94 5VB rating when it has a thickness of 1.5 mm.

7. The flame retardant resin composition according to claim 1 which attains UL94 5VB rating when it has a thickness of 1.2 mm.

8. The flame retardant resin composition according to claim 1 which attains UL94 5VB rating when it has a thickness of 1.0 mm.

9. A molded article of the flame retardant resin composition of claim 1.

* * * * *